(12) United States Patent
Maeng et al.

(10) Patent No.: US 10,505,743 B1
(45) Date of Patent: *Dec. 10, 2019

(54) SECURE DIGITAL COMMUNICATIONS

(71) Applicant: Wells Fargo Bank, N.A., San Francisco, CA (US)

(72) Inventors: Joon Maeng, Newcastle, WA (US); Ramanathan Ramanathan, Bellevue, WA (US); Thomas Hayes, Katy, TX (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,067

(22) Filed: Aug. 7, 2018

Related U.S. Application Data

(63) Continuation of application No. 15/264,540, filed on Sep. 13, 2016, now Pat. No. 10,075,300.

(51) Int. Cl.
| | |
|---|---|
| *H04L 9/32* | (2006.01) |
| *G06Q 20/38* | (2012.01) |
| *G06Q 20/36* | (2012.01) |
| *H04W 12/06* | (2009.01) |
| *H04L 9/08* | (2006.01) |
| *H04L 9/30* | (2006.01) |

(52) U.S. Cl.
CPC ........... *H04L 9/3249* (2013.01); *G06Q 20/36* (2013.01); *G06Q 20/3829* (2013.01); *H04L 9/083* (2013.01); *H04L 9/30* (2013.01); *H04L 9/3236* (2013.01); *H04L 9/3271* (2013.01); *H04W 12/06* (2013.01); *H04L 2209/56* (2013.01)

(58) Field of Classification Search
CPC ..................................................... H04L 9/3249
See application file for complete search history.

(56) References Cited

U.S. PATENT DOCUMENTS

| | | | |
|---|---|---|---|
| 4,893,338 A | 1/1990 | Pastor | |
| 5,872,844 A | 2/1999 | Yacobi | |
| 5,878,138 A | 3/1999 | Yacobi | |
| 6,250,557 B1 * | 6/2001 | Forslund | G06K 17/0022 235/375 |
| 7,118,027 B2 | 10/2006 | Sussman | |
| 7,120,609 B1 | 10/2006 | Kerkdijk | |
| 7,207,480 B1 | 4/2007 | Geddes | |
| 7,392,226 B1 | 6/2008 | Sasaki et al. | |

(Continued)

FOREIGN PATENT DOCUMENTS

CN 102693378 A 9/2012

OTHER PUBLICATIONS

Zhao et al.; The concept of Secure Mobile Wallet; Published in: Internet Security (WorldCIS), 2011 World Congress on; Date of Conference: Feb. 21-23, 2011; IEEE Xplore (Year: 2011).*

(Continued)

*Primary Examiner* — Bradley W Holder
(74) *Attorney, Agent, or Firm* — Schwegman Lundberg & Woessner, P.A.

(57) ABSTRACT

Disclosed in some examples are methods, systems, and machine readable mediums for secure end-to-end digital communications involving mobile wallets. The result is direct, secure, in-band messaging using mobile wallets that may be used to send messages such as payments, requests for money, financial information, or messages to authorize a debit or credit.

17 Claims, 18 Drawing Sheets

(56) References Cited

U.S. PATENT DOCUMENTS

| | | | |
|---|---|---|---|
| RE40,444 E | 7/2008 | Linehan | |
| 7,702,898 B2 | 4/2010 | Tan | |
| 7,822,688 B2 | 10/2010 | Labrou et al. | |
| 8,041,338 B2 | 10/2011 | Chen et al. | |
| 8,291,065 B2 | 10/2012 | Goodman et al. | |
| 8,423,462 B1 | 4/2013 | Amacker et al. | |
| 8,577,803 B2 | 11/2013 | Chatterjee et al. | |
| 8,583,926 B1 | 11/2013 | Benson | |
| 8,595,502 B2 | 11/2013 | Saito | |
| 8,732,022 B2 | 5/2014 | White | |
| 8,739,267 B2* | 5/2014 | Le Rouzic | G06Q 20/02 380/255 |
| 8,761,397 B1 | 6/2014 | Wright | |
| 8,769,260 B1 | 7/2014 | Kwan et al. | |
| 8,839,369 B1 | 9/2014 | Dai et al. | |
| 8,849,075 B2 | 9/2014 | Painter et al. | |
| 8,880,896 B1 | 11/2014 | Elliott | |
| 8,903,093 B2 | 12/2014 | Kim et al. | |
| 9,208,488 B2 | 12/2015 | Liberty | |
| 9,246,672 B2 | 1/2016 | Smith | |
| 9,317,018 B2* | 4/2016 | Spodak | G05B 1/01 |
| 9,704,143 B2 | 7/2017 | Walker et al. | |
| 9,721,147 B1 | 8/2017 | Kapczynski | |
| 9,734,345 B2* | 8/2017 | Spodak | G05B 1/01 |
| 9,858,572 B2* | 1/2018 | Brickell | G06Q 20/36 |
| 9,898,740 B2* | 2/2018 | Weller | G06F 21/31 |
| 9,904,800 B2* | 2/2018 | Spodak | G05B 1/01 |
| 9,940,618 B2 | 4/2018 | Kang | |
| 10,057,061 B1 | 8/2018 | Maeng et al. | |
| 10,057,225 B1 | 8/2018 | Hayes et al. | |
| 10,075,300 B1 | 9/2018 | Maeng et al. | |
| 2001/0007983 A1* | 7/2001 | Lee | G06Q 20/04 705/69 |
| 2005/0114367 A1 | 5/2005 | Serebrennikov | |
| 2006/0159260 A1 | 7/2006 | Pereira et al. | |
| 2006/0165060 A1 | 7/2006 | Dua | |
| 2007/0094727 A1 | 4/2007 | Singh | |
| 2007/0125838 A1* | 6/2007 | Law | G06Q 20/04 235/379 |
| 2007/0125840 A1* | 6/2007 | Law | G06Q 20/10 235/379 |
| 2008/0022089 A1 | 1/2008 | Leedom | |
| 2008/0208743 A1* | 8/2008 | Arthur | G06Q 20/105 705/41 |
| 2009/0125429 A1 | 5/2009 | Takayama | |
| 2010/0191602 A1 | 7/2010 | Mikkelsen et al. | |
| 2012/0005078 A1 | 1/2012 | Pitroda | |
| 2012/0036067 A1 | 2/2012 | Lee et al. | |
| 2012/0136732 A1* | 5/2012 | McMillen | G06Q 20/105 705/16 |
| 2012/0159149 A1 | 6/2012 | Martin et al. | |
| 2012/0198174 A1 | 8/2012 | Nellans et al. | |
| 2012/0210041 A1 | 8/2012 | Flynn et al. | |
| 2012/0221774 A1 | 8/2012 | Atkisson et al. | |
| 2012/0239578 A1 | 9/2012 | Kang et al. | |
| 2012/0240203 A1 | 9/2012 | Kling | |
| 2012/0290449 A1* | 11/2012 | Mullen | G06Q 10/00 705/27.2 |
| 2013/0275307 A1 | 10/2013 | Khan | |
| 2013/0275656 A1 | 10/2013 | Talagala et al. | |
| 2014/0032394 A1 | 1/2014 | Liberty et al. | |
| 2014/0040147 A1 | 2/2014 | Varadarajan et al. | |
| 2014/0058937 A1 | 2/2014 | Watson | |
| 2014/0058938 A1 | 2/2014 | Mcclung, III | |
| 2014/0188719 A1* | 7/2014 | Poornachandran | G06Q 20/36 705/41 |
| 2014/0279566 A1 | 9/2014 | Verma et al. | |
| 2014/0337230 A1 | 11/2014 | Bacastow | |
| 2014/0372298 A1* | 12/2014 | Singh | G06Q 20/3278 705/41 |
| 2014/0372299 A1* | 12/2014 | Singh | G06Q 20/36 705/41 |
| 2015/0006377 A1 | 1/2015 | Kang | |
| 2015/0067833 A1 | 3/2015 | Verma et al. | |
| 2015/0254640 A1 | 9/2015 | Cassano et al. | |
| 2015/0332395 A1 | 11/2015 | Walker et al. | |
| 2016/0012465 A1 | 1/2016 | Sharp | |
| 2016/0019542 A1 | 1/2016 | Eischen | |
| 2016/0028550 A1 | 1/2016 | Gaddam et al. | |
| 2016/0055483 A1 | 2/2016 | Liberty | |
| 2016/0092696 A1 | 3/2016 | Guglani et al. | |
| 2016/0117660 A1 | 4/2016 | Prakash et al. | |
| 2016/0162882 A1 | 6/2016 | McClung | |
| 2017/0032370 A1 | 2/2017 | Beltramino et al. | |
| 2017/0243315 A1* | 8/2017 | Ellerstein | G06Q 50/28 |

OTHER PUBLICATIONS

Mallat et al.; Mobile banking services; Published in: Magazine Communications of the ACM—New architectures for financial services CACM Homepage archive; vol. 47 Issue 5, May 2004; pp. 42-46; ACM Digital Library (Year: 2004).*
"U.S. Appl. No. 15/264,532, Corrected Notice of Allowance dated May 2, 2018", 2 pgs.
"U.S. Appl. No. 15/264,532, Examiner Interview Summary dated Apr. 23, 2018", 2 pgs.
"U.S. Appl. No. 15/264,532, Notice of Allowance dated Apr. 23, 2018", 16 pgs.
"U.S. Appl. No. 15/264,540, Notice of Allowance dated Apr. 17, 2018", 2 pgs.
"U.S. Appl. No. 15/394,526, Corrected Notice of Allowance dated May 2, 2018", 2 pgs.
"U.S. Appl. No. 15/394,526, Examiner Interview Summary dated Apr. 20, 2018", 2 pgs.
"U.S. Appl. No. 15/394,526, Notice of Allowance dated Apr. 20, 2018", 17 pgs.
"U.S. Appl. No. 15/963,469, Notice of Allowance dated Feb. 1, 2019", 14 pgs.
"U.S. Appl. No. 16/041,000, Preliminary Amendment filed Nov. 7, 2018", 8 pgs.
"U.S. Appl. No. 16/057,094, Preliminary Amendment filed Dec. 26, 2018", 8 pgs.
"Business Description", SET Secure Electronic Transaction Specification, (May 1997), 80 pgs.
"Electronic Commerce Modeling Language", RFC 4112—Version 2 Specification, (Jun. 2005), 36 pgs.
"Formal Protocol Definition", SET Secure Electronic Transaction Specification, (May 1997), 262 pgs.
"How email works (MTA, MDA, MUA)", [Online]. Retrieved from the Internet: <URL: kioskea.net> http://ccm.net/contents/116-how-email-works-mta-mda-mua, (Jun. 2014), 2 pgs.
"Online E Wallet System with Decentralized Credential Keepers", Mobile Networks and Applications 8, (2003), 87-99.
"Programmers Guide", SET Secure Electronic Transaction Specification, (May 1997), 629 pgs.
"The 'mailto' URI Scheme", RFC 6068, (Oct. 2010), 17 pgs.
"Uniform Resource Identifier", RFC3986, (Jan. 2005), 61 pgs.
Crispin, M., "Internet Message Access Protocol", Version 4rev1—Network Working Group RFC3501, (Mar. 2003), 108 pgs.
Klensin, J., "Simple Mail Transfer Protocol", RFC5321, (Oct. 2008), 96 pgs.
Labrou, Yannis, et al., "Wireless Wallet", The First Annual International Conference on Mobile and Ubiquitous Systems: Networking and Services, 2004. IEEE, (2004), 10 pgs.
Mallat, Niina, et al., "Mobile Banking Service", Communications of the ACM, vol. 47, No. 5, (May 2004), 42-46.
Myers, J., et al., "Post Office Protocol—Version 3 degree", RFC 1939, (May 1996), 24 pgs.
Zhao, Hao, et al., "The Concept of Secure Mobile Wallet", Internet Security, IEEE Xplore, 2011 World Congress, Feb. 21-23, 2011, (2011), 5 pgs.

* cited by examiner

```
                                                    ┌─ 15000
                                                    ↙

┌─ 15005
┌─────────────────────────────────────────────┐
│  RECEIVE A FIRST DATA PACKET OVER A FIRST   │
│ TRANSMISSION PATH AND A SECOND DATA PACKET OVER A │
│  SECOND TRANSMISSION PATH, THE FIRST DATA PACKET  │
│  INCLUDING A FIRST ENCRYPTED TRANSACTION UNIT AND A │
│   SECOND CRYPTOGRAPHIC KEY AND THE SECOND DATA    │
│  PACKET INCLUDING A SECOND ENCRYPTED TRANSACTION  │
│      UNIT AND A FIRST CRYPTOGRAPHIC KEY           │
└─────────────────────────────────────────────┘
                         │
                         ▼              ┌─ 15010
┌─────────────────────────────────────────────┐
│  DECRYPTING THE FIRST ENCRYPTED TRANSACTION UNIT  │
│   USING THE SECOND CRYPTOGRAPHIC KEY AND THE      │
│  SECOND ENCRYPTED TRANSACTION UNIT USING THE FIRST │
│              CRYPTOGRAPHIC KEY                    │
└─────────────────────────────────────────────┘
                         │
                         ▼              ┌─ 15015
┌─────────────────────────────────────────────┐
│  COMBINE THE FIRST DECRYPTED TRANSACTION UNIT AND │
│   THE SECOND DECRYPTED TRANSACTION UNIT INTO A    │
│             TRANSACTIONAL MESSAGE                 │
└─────────────────────────────────────────────┘
                         │
                         ▼              ┌─ 15020
┌─────────────────────────────────────────────┐
│  FORWARDING THE TRANSACTIONAL MESSAGE TO A MOBILE │
│         WALLET FOR FURTHER PROCESSING             │
└─────────────────────────────────────────────┘
```

*FIG. 15*

SECURE DIGITAL COMMUNICATIONS

CROSS-REFERENCE TO RELATED APPLICATION

This application is a continuation of U.S. patent application Ser. No. 15/264,540, filed Sep. 13, 2016, which is incorporated by reference herein in its entirety.

TECHNICAL FIELD

Embodiments pertain to secure digital communications. Some embodiments relate to secure digital communications between mobile devices and other domains.

BACKGROUND

Computer networks have enabled communications between distant locations. These communications utilize protocols such as Transmission Control Protocol (TCP), User Datagram Protocol (UDP), Internet Protocol (IP), HyperText Transfer Protocol (HTTP), Message Transfer Protocol (MTP), and the like.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 15 shows a flowchart of a method for securing mobile wallet message transmissions between a recipient and a sender according to some examples of the present disclosure.

DETAILED DESCRIPTION

Figure 1:
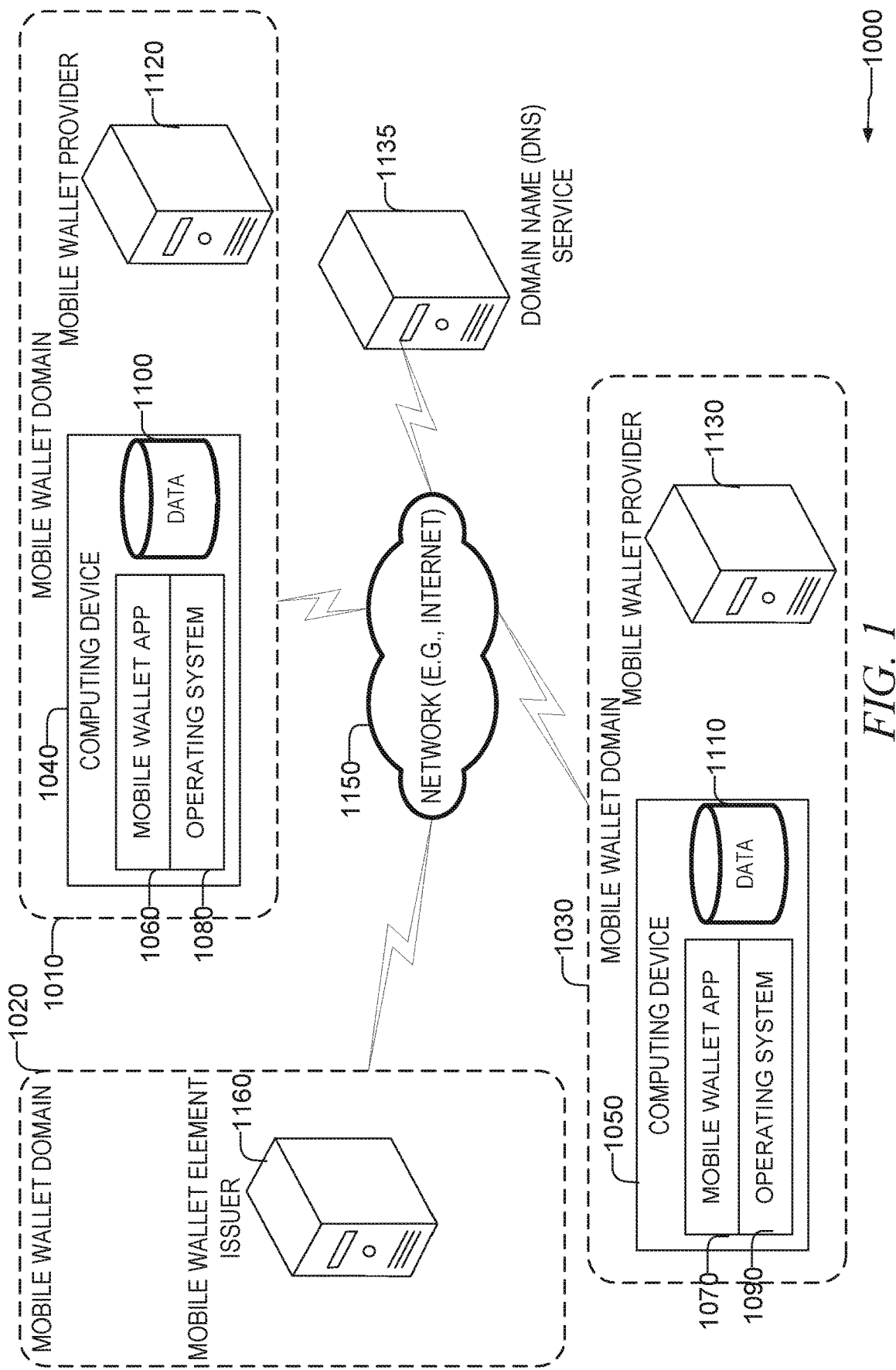
FIG. 1 shows a schematic of a mobile wallet secure digital communication environment according to some examples of the present disclosure.

A mobile wallet (also known as an electronic or digital wallet) refers to an application program executed by one or more computing devices (e.g, mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student ids, library cards, membership cards, insurance cards, and soon. The mobile wallet application allows an individual to use the stored information to pay for items (either in person or in e-commerce transactions), provide for identification (e.g, producing a driver's license), transfer money to others, access bank accounts, collect discount coupons, submit subway passes, and the like. As another example, a mobile wallet may be used to verify the age of a buyer while purchasing alcohol. Exemplary mobile wallets include but are not limited to APPLE PAY®, ANDROID PAY®, GOOGLE WALLET®, CURRENT C® by MCX®, SAM SUNG PAY®, and peer-to-peer payment apps such as VENMO®, SQUARE CASH®, and TILT APP®.

Mobile wallet applications of one user presently do not securely communicate with the mobile wallet applications of another user. The user of the mobile wallet must perform any such communications out-of-channel through email, short message service, or the like. These communications may not be secure.

Disclosed in some examples are methods, systems, and machine readable mediums for secure end-to-end digital communications involving mobile wallets. The result is direct, secure, in-band messaging using mobile wallets that may be used to send messages such as payments, requests for money, financial information, messages to authorize a debit or credit, and messages to provide an identification of the user.

In some examples, mobile wallets will each have an address which will utilize a new Internet top-level domain. For example, fred.jones@abc.mwallet, where "abc" is a mobile wallet domain and mwallet is the top-level domain. While ".mwallet" is used herein, one of ordinary skill with the benefit of the present disclosure will appreciate that other top-level domain names may be utilized. A mobile wallet domain may provide one or more services to the mobile wallets in its domain to facilitate mobile wallet communications. In some examples, mobile wallet domains may be provided by mobile wallet providers.

A first mobile wallet (sender mobile wallet) sends a message to a second mobile wallet (recipient mobile wallet) by utilizing a mobile wallet message transfer agent (MTA) provided by its mobile wallet domain. The MTA of the sender mobile wallet retrieves the public key of the recipient mobile wallet from a public key server (PKS) provided by the recipient's mobile wallet domain. The sender mobile wallet encrypts the message with this public key, sends it to the MTA in its mobile wallet domain, which then sends the message to an MTA provided by the recipient's mobile wallet domain. The recipient mobile wallet domain's MTA stores the encrypted message in a message storage agent (MSA). The MSA notifies the recipient mobile wallet application of the request. The recipient mobile wallet may then download the message and decrypt it with its private key. The encryption keys may be created by the mobile wallets or the mobile wallet domains. The public key may be stored with a PKS and the private key may be maintained in one or more of: the mobile wallet in an encrypted form, the mobile wallet domain provider (e.g, mobile wallet provider), and a trusted third party (which may not be related to the mobile wallet domain provider).

Through utilizing this process, two mobile wallets may securely communicate. Additionally, mobile wallet communications may not be limited to two mobile wallets communicating. The methods and systems disclosed here may be utilized where only one endpoint is a mobile wallet. For example, a merchant may accept a mobile wallet payment through a mobile wallet message. Mobile wallets may communicate with one or more financial institutions using the methods and systems described to authorize payments, deduct funds, transfer funds, and the like. Mobile wallets may communicate with any number of endpoints using the disclosed techniques. Other example endpoints include government agencies, individuals, sellers, buyers, and the like. For example, a mobile wallet may communicate information about a digital identification with a merchant to provide age verification for certain products.

Turning now to FIG. 1, a schematic 1000 of a mobile wallet secure digital communication environment is shown according to some examples of the present disclosure. Three mobile wallet domains 1010, 1020, and 1030 are shown. Mobile wallet domains 1010 and 1030 include two respective user computing devices 1040 and 1050 with mobile wallet applications 1060 and 1070 executing along with operating systems 1080 and 1090 respectively. Mobile wallet domains may be provided by one or more mobile wallet providers. Mobile wallet providers may administer one or more mobile wallet domains. The mobile wallet applications 1060 and 1070 may originate from the mobile wallet providers 1120 and 1130 respectively.

Mobile wallet applications 1060 and 1070 store one or more data structures that store digital representations of payment and non-payment elements of the user. In some examples, this may be identification information (drivers licenses), financial information (credit card information, bank card information, bank account information), and the like. A digital representation may include one or more information fields stored by the mobile wallet and providing information about the user (e.g, account number, user age, user name, and the like) and in some cases verification (e.g, a certificate or other means to assure that the digital representation is authentic). Operating systems 1080 and 1090 provide services to the mobile wallets (and other applications) on the computing devices 1040 and 1050 such as scheduling tasks for execution, controlling peripherals, providing an interface to the hardware, managing memory, and the like.

Computing devices 1040 and 1050 may also contain data storage devices 1100 and 1110 that may store mobile wallet application data, including mobile wallet messages, encryption keys, address books, data structures storing information about the user of the computing device (such as information on payment and non-payment elements of the mobile wallet), and the like. Mobile wallet domains 1010, and 1030 may have mobile wallet providers 1120 and 1130 that provide mobile wallet communication services to the mobile wallets within their respective mobile wallet domains 1010 and 1030. Example services include message forwarding, message storage, message encryption, and the like.

Domain Name Service (DNS) 1135 translates a domain name (e.g, abc@walletprovider.mwallet) to an Internet Protocol (IP) address that may be utilized to send messages to that mobile wallet domain. Mobile wallet domains 1010, 1020, 1030, and DNS 1135 may communicate over computer network 1150, which in some examples may be the Internet. Mobile wallet domain 1020 may include mobile wallet element issuer 1160. Mobile wallet element issuer 1160 may contain applications which may communicate with mobile wallets in other mobile wallet domains according to the present disclosure. Example mobile wallet issuers include banks, merchants, government organizations, corporations, or the like. In some examples, the mobile wallet provider (e.g, mobile wallet providers 1120 and/or 1130) and the mobile wallet element issuer 1160 may be the same entity.

Figure 2:
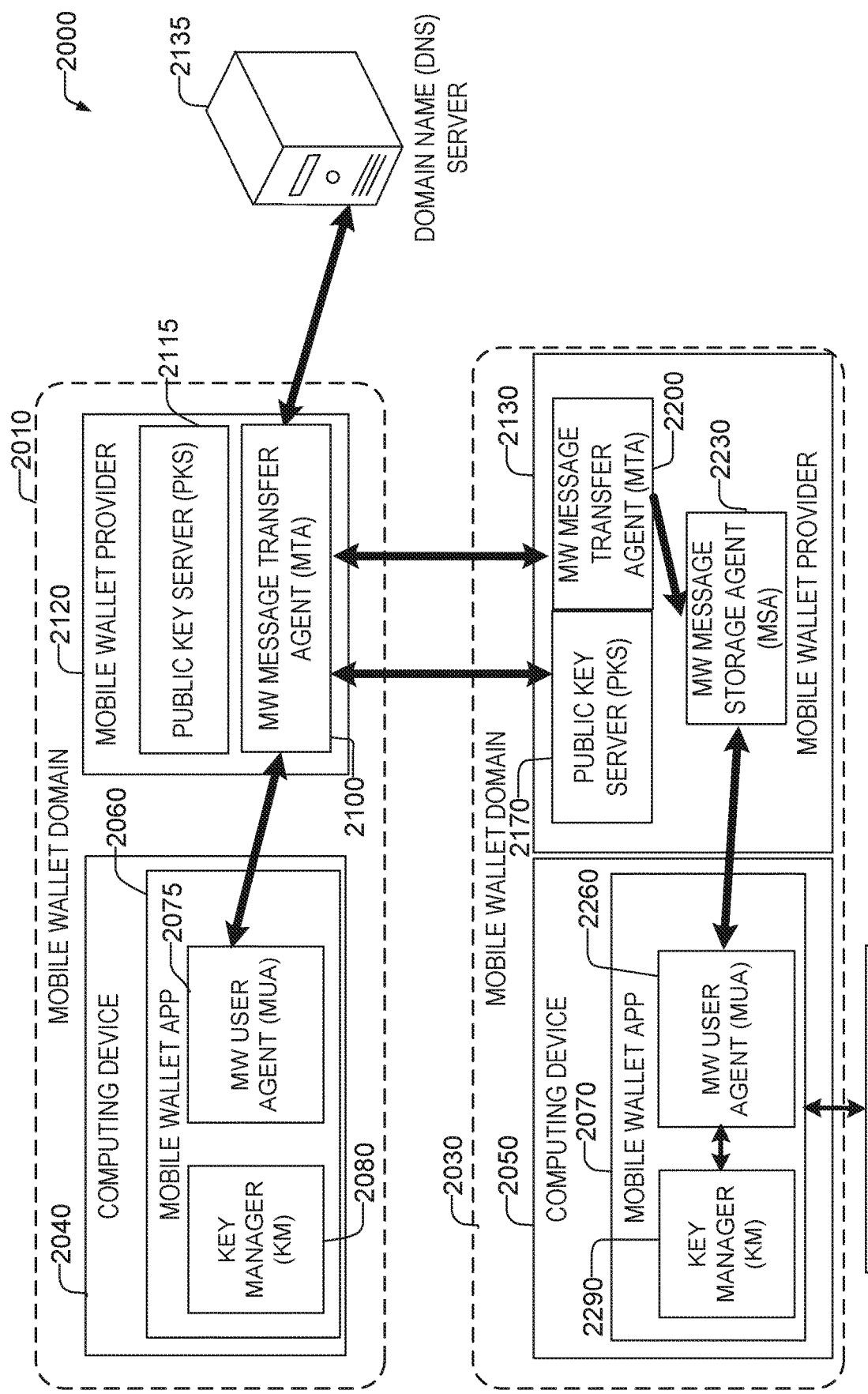
FIG. 2 shows a schematic of a mobile wallet to mobile wallet secure digital communication according to some examples of the present disclosure.

Mobile wallet element issuer 1160 may issue one or more identification cards, credit cards, bank cards, bank accounts, or the like to one or more users of mobile wallets (e.g, mobile wallet applications 1060 and 1070). Mobile wallet element issuer 1160 may include one or more of the components of mobile wallet providers 1120 and 1130 as shown in FIG. 2 (e.g, PKS, MTA, MSA). In some examples, these elements may be issued by sending the digital representations to one or more mobile wallet recipients. Thus, using the disclosed techniques, it may be possible to automatically provision and populate a mobile wallet with little consumer effort.

Turning now to FIG. 2, a schematic 2000 of a mobile wallet to mobile wallet secure digital communication is shown according to some examples of the present disclosure. Mobile wallet domain 2010 may be an example implementation of mobile wallet domain 1010 and mobile wallet domain 2030 may be an example implementation of mobile wallet domain 1030 of FIG. 1. Similarly, computing device 2040, mobile wallet application 2060 and mobile wallet provider 2120 may be an example implementation of computing device 1040, mobile wallet application 1060 and mobile wallet provider 1120 respectively of FIG. 1 in some examples. Computing device 2050, mobile wallet application 2070 and mobile wallet provider 2130 may be an example implementation of computing device 1050, mobile wallet application 1070 and mobile wallet provider 1130 respectively of FIG. 1 according to some examples.

A first mobile wallet application 2060 executing on a computing device 2040 in a first mobile wallet domain 2010 is sending a message to a second mobile wallet application 2070 executing on a second computing device 2050 in a second mobile wallet domain 2030. Mobile wallet application 2060 may include a mobile wallet user agent (MUA) 2070 and a key manager 2080. The MUA 2075 allows users to compose, send and retrieve mobile wallet (MW) messages. Key manager 2080 may one or more of: create, provision, register, store, and manage one or more cryptographic keys. Key manager 2080 may register (or obtain) a public key with a certificate authority (not shown for clarity) and with a PKS 2115.

A mobile wallet application 2060 may provide one or more graphical user interfaces (GUI)s to allow users to compose and edit one or more mobile wallet messages. Before sending a message, the MUA 2075 requests the recipient's public key from the MTA 2100. The PKS 2115 and MTA 2100 may be provided by the mobile wallet provider 2120 of the mobile wallet domain 2010. The PKS 2115 and MTA 2100 may be provided by the same computing device, or different computing devices. While the PKS 2115 and MTA 2100 are shown as part of the mobile wallet provider 2120, they may be provided by separate entities. The MTA and PKS are accessible to computing device 2040 and other computing devices both within the mobile wallet domain 2010 and other devices within other mobile wallet domains, over one or more networks (not shown for clarity). These networks may include one or more portions of: Local Area Networks (LAN), Wide Area Networks (WAN), Metropolitan Area Networks (MAN), the Internet, cellular networks, and the like.

The MTA 2100 first examines the message to determine which mobile wallet domain the recipient is in. If the mobile wallet domain is mobile wallet domain 2010, the MTA may retrieve the public key from the PKS 2115 of mobile wallet domain 2010. If the mobile wallet domain is in another domain, then the MTA checks its DNS cache to determine if it already knows the IP address of the recipient mobile wallet domain's PKS. If the mobile wallet domain is not in the DNS cache, the MW sends a lookup message to DNS server 2135 using the Domain Name System Protocol. DNS server 2135 responds with an IP address of the mobile wallet domain (or an error). Once the address is determined (either through the cache or the DNS server 2135), the MTA 2100 sends a message to the PKS 2170 asking for the public key of the recipient mobile wallet (e.g., mobile wallet application 2070). The response includes the recipient's public key. The public key is then passed by the MTA 2100 to the MUA 2075.

In some examples, the public key is passed to the MTA 2100 in the form of a digital certificate issued by a Certificate Authority (CA). A digital certificate typically includes the name and other identification information of the holder, the holder's public key, the name of the CA, a serial number, and a validity period. The information in the digital certificate is signed by the issuing CA using the issuing CA's private key. The signature can be verified using the CA's public key (which is known and may be pre-installed on the computing devices). This may serve as a means to verify that the public key is owned by the recipient. For example, the PKS 2170 may provide a digital certificate created by a trusted CA for the recipient mobile wallet application 2070 in response to the request for the recipient's public key. MUA 2075 (or MTA 2100) may utilize the CA's public key and decrypt the certificate. The certificate may then be checked to determine that the message was not tampered with, and that the public key therein belongs to the mobile wallet application 2070 (e.g., authentication and verification).

Once the MUA 2075 is satisfied with the public key, the MUA 2075 then encrypts the contents of the message with the received public key and sends it to the MTA 2100. The MTA 2100 determines the IP Address of the recipient mobile wallet domain's MTA 2200. In some examples, the MTA 2100 utilizes the IP Address previously determined from the DNS server (e.g., using the cache) when retrieving the public key of the recipient. For example, the PKS 2170 and MTA 2200 may have the same IP Address, or the IP Address of the MTA 2200 may be derivable from the IP Address of the PKS 2170. In other examples a mobile wallet application in mobile wallet domain 2010 may have previously communicated with a mobile wallet in mobile wallet domain 2030 (and thus the MTA 2100 still has the IP Address in its cache). In other examples, the MTA 2100 may re-request the IP Address from the DNS server 2135.

The MTA 2100 then sends the message 2190 to the MTA 2200 of the mobile wallet provider 2130 of the recipient mobile wallet domain 2030 using the determined IP address. MTA 2200 may send a response to MTA 2100 (which may be forwarded to MUA—but this message is not shown for clarity). MTA 2200 may then send the message to the mobile wallet message storage agent (MSA) 2230. Note that the mobile wallet provider 2120 may also employ a MSA, but it is not shown for clarity. MSA 2230 may then store the message and alert the MUA 2260 of the recipient mobile wallet application 2070 using a notification. When the MUA is interested in receiving the message, the MUA may request it and the MSA may provide it. The MUA may decrypt the message using its private key. The private key may be maintained in the key manager 2290. Key manager 2290 may communicate with key keeper 2300. Key keeper 2300 may be a remote key storage facility to prevent the loss of the cryptographic key s should the computing device 2050 experience a loss in data. For example, the key manager 2290 may store one or more key s of the mobile wallet application 2070 in the key keeper 2300.

In some examples, the mobile wallet application 2070 may utilize a second cryptographic key to encrypt the private key. The private key may then be stored with the mobile wallet provider 2130 in encrypted form. The second cryptographic key may then be stored with the key keeper 2300 and utilized to decrypt the private key should the computing device 2050 need it. The key keeper 2300 may be under control of the user of computing device 2050. This ensures that the private key is not given to the mobile wallet provider 2130 and thus the user can entrust that no one associated with the mobile wallet provider 2130 can access their messages. The key keeper 2300 may be a trusted entity by the mobile wallet 2070 which may be a service provider, a home computer of the mobile wallet owner, a companion device of the computing device 2050 (e.g., a smart watch that can be paired with a smartphone with mobile wallet), etc.

Figure 3:
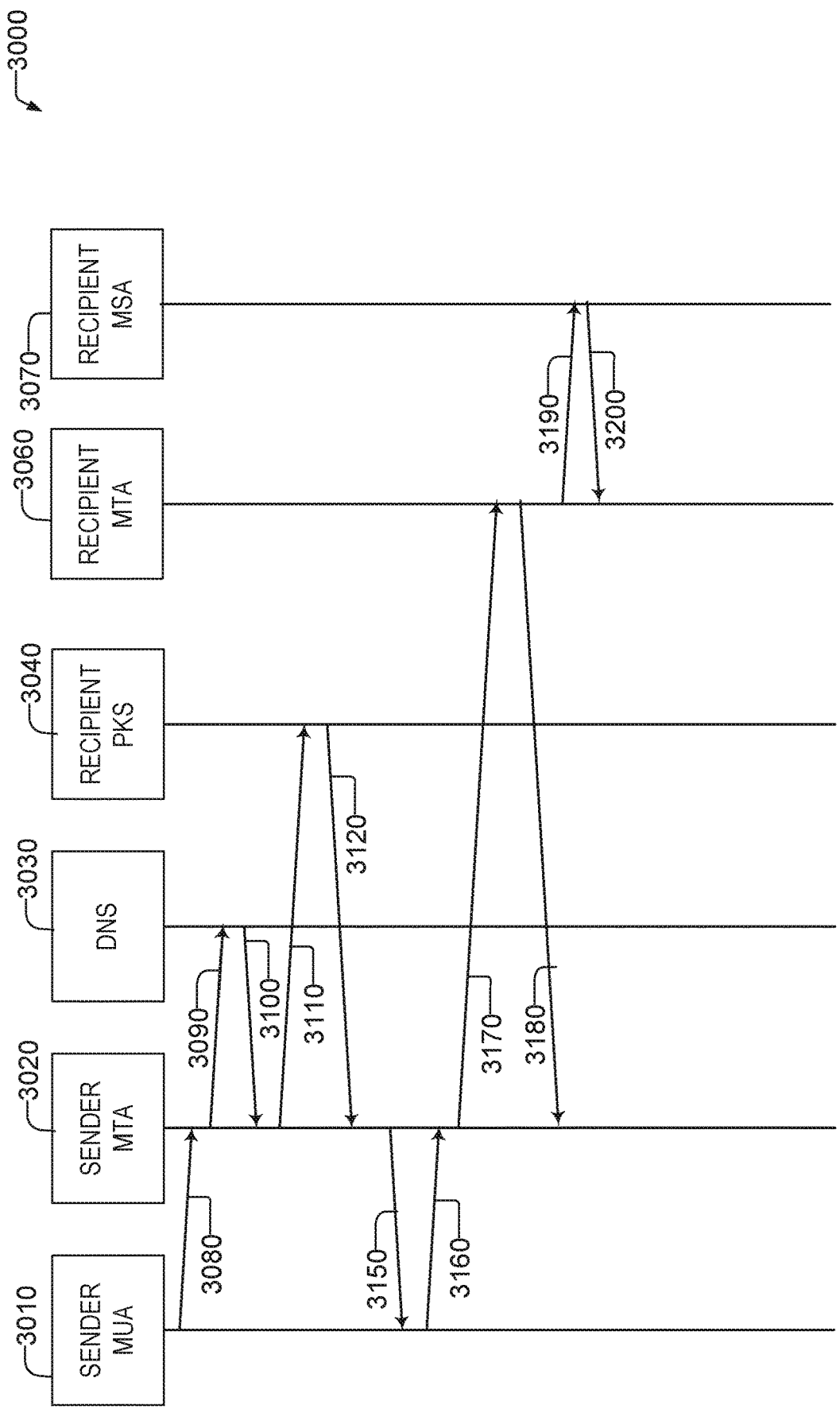
FIG. 3 shows a message sequence chart showing a mobile wallet communication according to some examples of the present disclosure.

Turning now to FIG. 3, a message sequence chart showing a mobile wallet communication is shown according to some examples of the present disclosure. Sender MUA 3010 sends a public key request 3080 to request a recipient mobile wallet's public key to the sender MTA 3020 in sender MUA 3010's mobile wallet domain. In this request the sender MUA 3010 includes the address of the recipient mobile wallet (part of the address is a mobile wallet domain name). The sender MTA 3020 may determine the Internet Protocol Address of the mobile wallet domain name using DNS 3030 via request message 3090. Response 3100 from DNS 3030 includes the address of the recipient mobile wallet's domain. Sender MTA 3020 may then cache this address for later use. In some examples, if the sender MTA 3020 already has the IP address of the recipient PKS 3040 from a previous DNS request (e.g, in its DNS cache), messages 3090 and 3100 may not be needed.

The sender MTA 3020 then uses this address to contact the recipient public key server (PKS) 3040 using message 3110 requesting the public key of the recipient. The recipient PKS 3040 may reply with the recipient's public key using message 3120. As already noted the response from the PKS 3040 may be a digital certificate issued by a trusted CA.

Sender MUA 3010 may then send a completed mobile wallet message 3160 to sender MTA 3020. This mobile wallet message may be encrypted by the sender MUA 3010 with the public key obtained at operation 3150. In some examples, the message is not unencrypted until received by the recipient MUA—as such, the message is encrypted end-to-end. Sender MTA 3020 may then pass this message 3170 to recipient MTA 3060 using the address received from DNS 3030 in message 3100. In some examples, if the time elapsed between the sender MUA 3010 requesting the public key of the recipient and the time between sending the message 3160 is too great, the sender MTA 3020's cache may have cleared and thus the sender MTA 3020 may have to re-request the Internet Protocol (IP) Address of the recipient mobile wallet domain. In other examples, the IP Address of the recipient PKS 3040 and the recipient MTA 3060 may be different and thus the sender MTA 3020 may have to make two separate DNS requests. In still other examples, the IP Address of the recipient MTA 3060 and the recipient PKS 3040 may be derivable from each other, such that if the sender MTA 3020 knows the IP address of one, it may determine the IP address of the other without a DNS query.

Recipient MTA 3060 may respond with a confirmation 3180 that this message was received and the recipient is a valid recipient mobile wallet. Recipient MTA 3060 then passes the message 3190 to recipient MSA 3070 for storage. Recipient MSA 3070 may acknowledge receipt of the message 3190 with ack message 3200.

Figure 4:
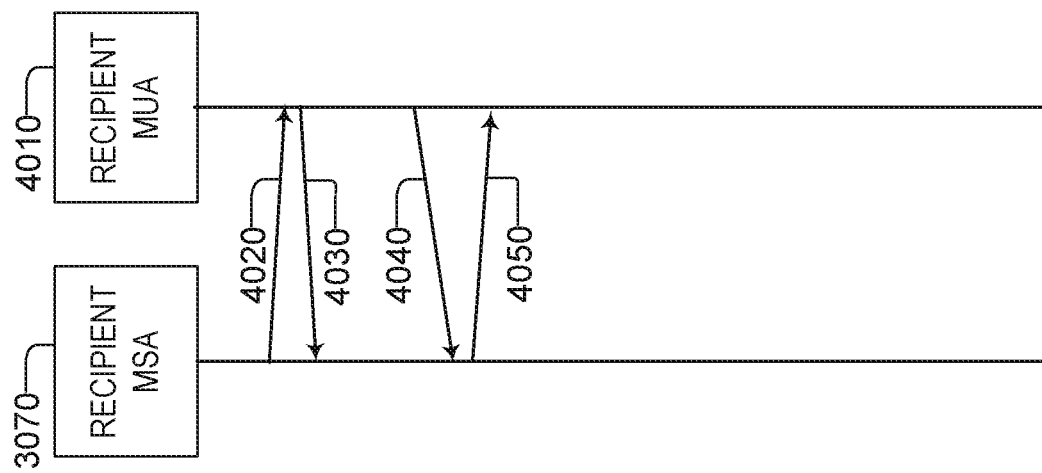
FIG. 4 shows a message sequence chart that is a continuation of FIG. 3 according to some examples of the present disclosure.

Continuing now to FIG. 4, the recipient MSA 3070 may send a message 4020 notifying the recipient mobile wallet user agent (MUA) 4010 that a message is waiting for the recipient MUA 4010. Recipient MUA 4010 may acknowledge this notification with reply message 4030. When the recipient MUA 4010 wishes to retrieve this message, recipient MUA 4010 may send a request message 4040 to the recipient MSA 3070 for the message. Recipient MSA 3070 may then send a reply 4050 with the message. Recipient MUA 4010 may then utilize its private key to decrypt and read the message. In some examples, rather than a notification, the recipient MUA 4010 may simply poll the recipient MSA 3070 periodically for new messages. In yet other examples, the recipient MSA 3070 will immediately deliver the message to the MUA 4010 unless the MUA 4010 is offline, in which case the recipient MSA 3070 will store the message until the MUA 4010 is back online (at which point it will deliver the message to the MUA 4010).

Figure 5:
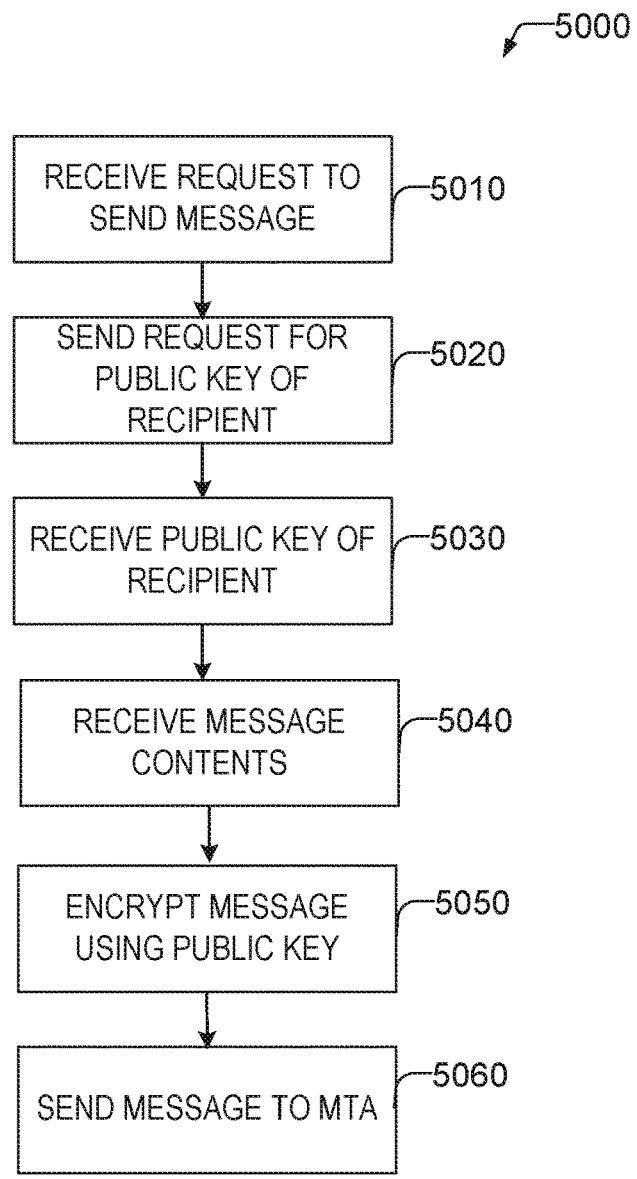
FIG. 5 shows a flowchart of a method of an MUA sending a mobile wallet message according to some examples of the present disclosure.

FIG. 5 shows a flowchart of a method 5000 of a MUA sending a mobile wallet message according to some examples of the present disclosure. At operation 5010 the MUA receives a request to send a message. For example, a user utilizing a Graphical User Interface (GUI) provided by a mobile wallet application may request to send a message. For example, the user presses a "compose" button and enters a recipient's mobile wallet address and presses a "send" button. At operation 5020, the MUA determines the recipient(s) of the message and sends a request for the public key of the recipient(s) to the MTA of the user's current mobile wallet domain. At operation 5030, the MUA receives the public keys. These public keys may be cached or stored to avoid future calls to the MTA in future messages. In some examples, the public keys may be received as a digital certificate signed by a trusted CA. The MUA may attempt to verify the digital certificate and if the verification is successful, processing may continue, otherwise, processing may terminate and the user may be notified of the unsuccessful verification.

At operation 5040 the MUA may receive the message contents of the mobile wallet to mobile wallet message. At operation 5050 the MUA may encrypt the message using the public key received at operation 5030. At operation 5060, the MUA may send the encrypted message to the MTA. In some examples, the MTA may respond to the MUA and the MUA may retransmit the message if it did not receive the acknowledgement from the MTA. If there are multiple recipients of the mobile wallet message, the message may be encrypted and sent separately for each recipient.

Figure 6:
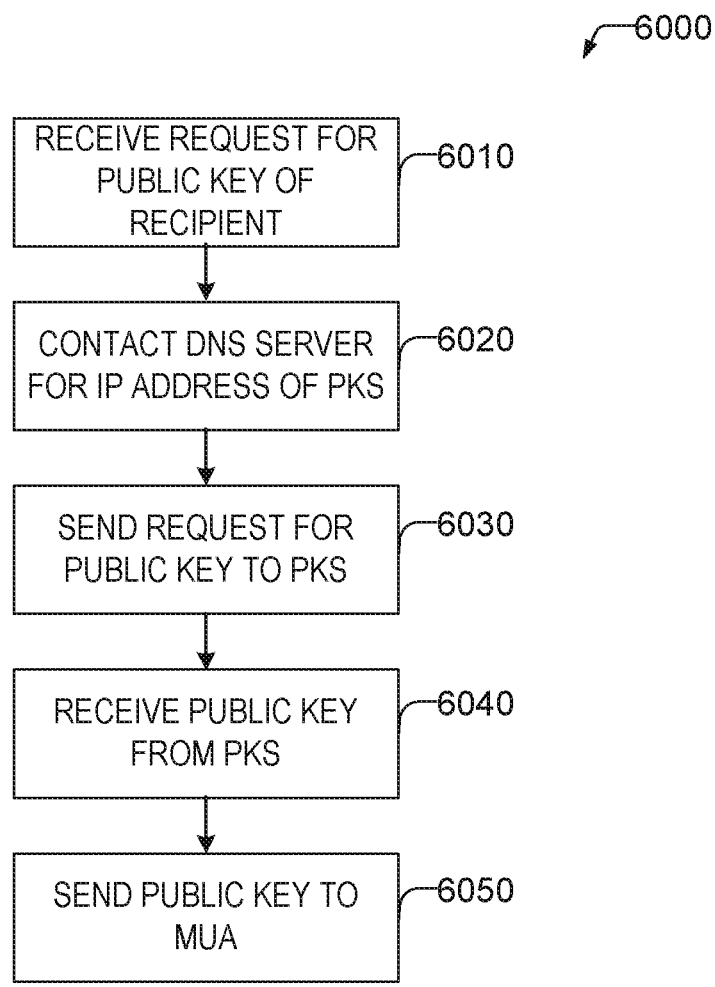
FIG. 6 shows a flowchart of a method of a MTA requesting a public key of a recipient mobile wallet according to some examples of the present disclosure.

FIG. 6 shows a flowchart of a method 6000 of a MTA requesting a public key of a recipient mobile wallet according to some examples of the present disclosure. At operation 6010 the MTA may receive a request for a public key of a recipient from an MUA. At operation 6020 the MTA may contact a Domain Name Server (DNS) for the IP address of the Public Key Server (PKS) of the recipient mobile wallet domain. At operation 6030 the MTA sends a request to the PKS of the recipient's mobile wallet domain. At operation 6040 the MTA receives the public key from the PKS. At operation 6050 the MTA sends this public key to the MUA.

In some examples, the MTA may cache or otherwise store DNS responses. If the MTA already has the IP address of the recipient mobile wallet domain's PKS, operations 6020 and 6030 may be omitted. Additionally, the method shown is utilized to retrieve a key for a remote mobile wallet domain. If the recipient is in the same mobile wallet domain as the sender (and also the MTA), then operations 6020 and 6030 are also not needed, and the PKS in operation 6030 is the local mobile wallet domain's PKS. Furthermore, the MTA may also cache public key s of recipient devices so as to instantly provide these key s to requesting MUAs in their mobile wallet domain. If the public key is cached (and the cache is not expired), then operations 6020-6040 are not necessary.

Figure 7:
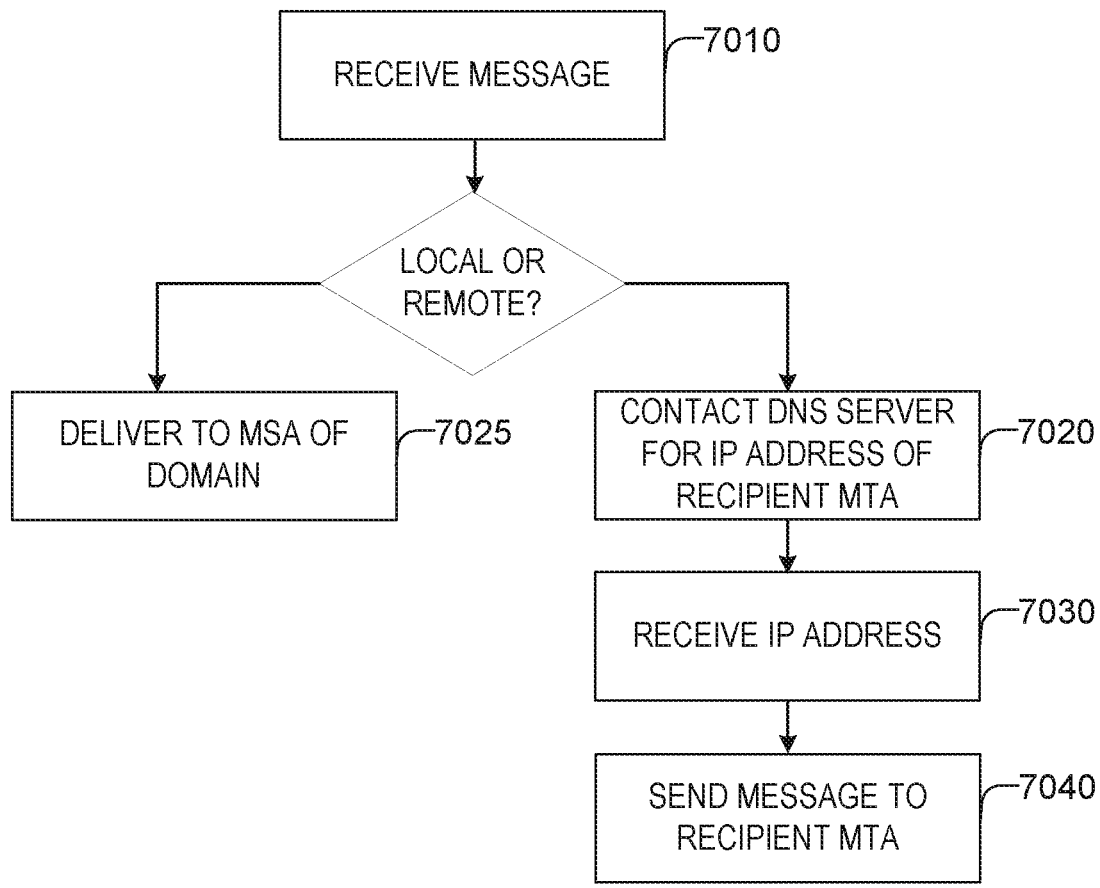
FIG. 7 shows a flowchart of a method of a MTA sending a message to another MTA according to some examples of the present disclosure.

FIG. 7 shows a flowchart of a method 7000 of a MTA sending a message to another MTA according to some examples of the present disclosure. At operation 7010 the MTA may receive a completed message for sending to another mobile wallet. This message may be encrypted, however, the header identifies its destination. If the message is to another mobile wallet in the same mobile wallet domain, the MTA delivers the message to the message storage agent of the mobile wallet domain at operation 7025. Otherwise, at operation 7020, the MTA may contact the DNS server for the IP address of the recipient MTA. In some examples, if the MUA previously requested the public key, it's possible that the DNS record is cached and this operation is not needed. At operation 7030 the IP address is received. At operation 7040, the message is sent to the IP address received at operation 7030. In some examples, the message may be sent using standard Internet protocols such as Internet Protocol (IP), Transmission Control Protocol (TCP), HyperText Transfer Protocol (HTTP), Simple Mail Transfer Protocol (SMTP), and the like.

Figure 8:
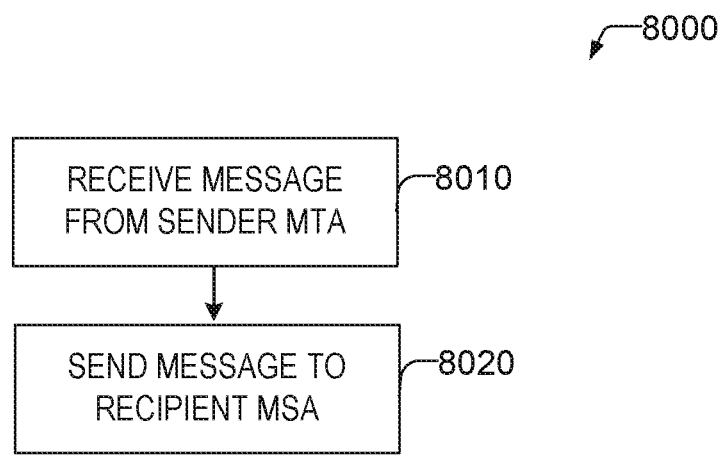
FIG. 8 shows a flowchart of a method of an MTA receiving a message sent by another MTA according to some examples of the present disclosure.

FIG. 8 shows a flowchart of a method 8000 of an MTA receiving a message sent by another MTA according to some examples of the present disclosure. At operation 8010 the MTA receives the message from the sender MTA. At this point the MTA may verify that the intended recipient is registered with the mobile wallet domain and is a proper recipient. If the MTA is a proper recipient, then at operation 8020 the message is sent to the recipient MSA for storage.

Figure 9:
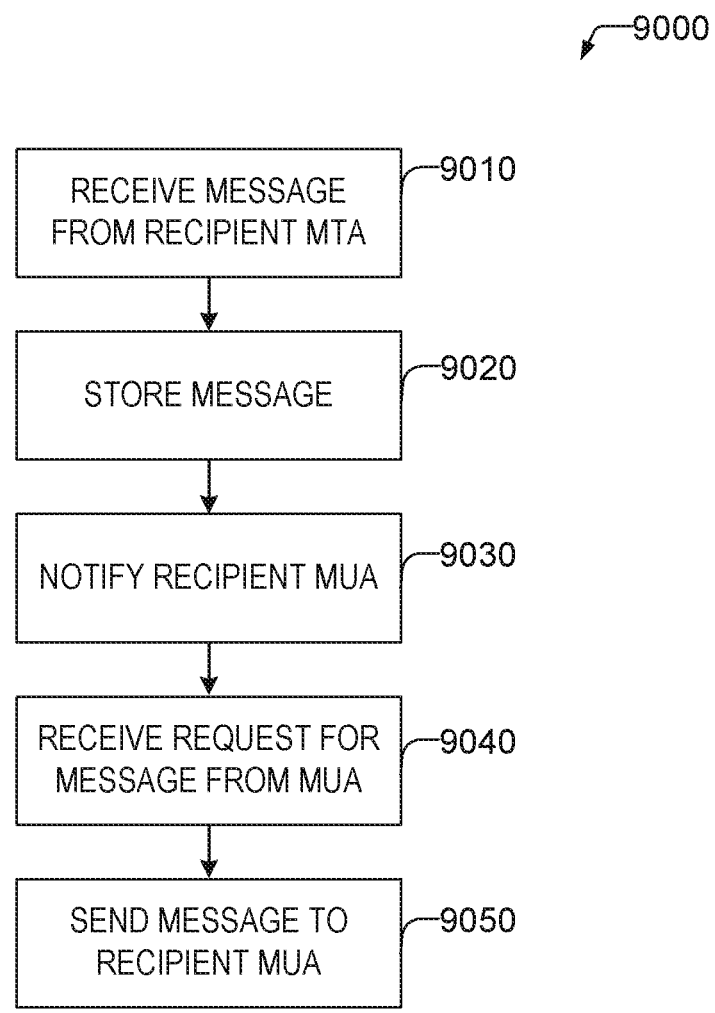
FIG. 9 shows a flowchart of a method of a recipient MSA receiving a message according to some examples of the present disclosure.

FIG. 9 shows a flowchart of a method 9000 of a recipient MSA receiving a message according to some examples of the present disclosure. At operation 9010 an MTA sends the MSA a message destined for a mobile wallet in the MSA's mobile wallet domain. The MSA stores the message at operation 9020. This may be a storage device, a database, or the like. At operation 9030 the recipient MUA of the recipient's computing device is notified. For example, the MUA may register its address with the MSA to be notified of new communications. The notification may be a message sent over a network to the MUA. The MUA may then respond by downloading the message. At operation 9040 the MUA may request the message. This request may include one or more verifications to ensure that only the recipient MUA is allowed to access the message. At operation 9050 the message is sent to the recipient MUA. In some examples, once the message is delivered the message may be deleted from storage. In other examples, the message may be retained for later downloading.

Figure 10:
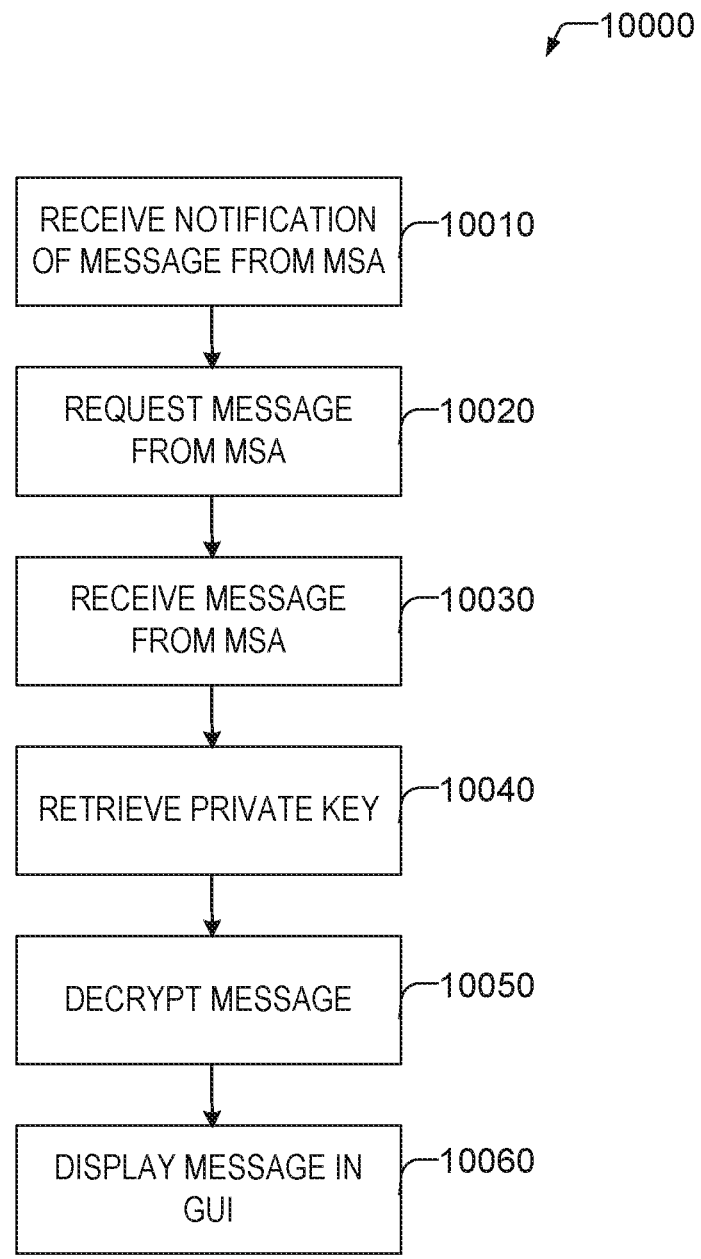
FIG. 10 shows a flowchart of a method of a recipient MUA receiving a message is shown according to some examples of the present disclosure.

Turning now to FIG. 10, a flowchart of a method 10000 of a recipient MUA receiving a message is shown according to some examples of the present disclosure. At operation 10010 the recipient MUA may receive a notification from the MSA in its mobile wallet domain. At operation 10020 the MUA may request the message from the MSA. Operation 10020 may happen much later than the receipt of the notification at operation 10010. For example, the MUA may wait for a user to indicate that they are interested in viewing the message before retrieving it. At operation 10030 the message may be received from the MSA. At operation 10040, the private key of the MUA is retrieved. The private key may be stored by the MUA, or may be in the key keeper. At operation 10050 the message may be decrypted. This may also happen later. For example, the MUA may download the message immediately, but store it encrypted on the computing device of the user. In some examples, the MUA may only decrypt the message upon receiving a request to view the message by the user. This may protect the message by storing it encrypted. At operation 10060 the message may be displayed to a user, such as in a GUI provided by the mobile wallet application. In other examples, the message may trigger one or more payments, deductions from balances, or other actions.

Public and private keys for a mobile wallet used by the present disclosure may be generated by a key manager component of the mobile wallet application. In these examples the public key is then communicated to the public key server provided by the mobile wallet provider for distribution to other mobile wallets. In some examples, the private key may be encrypted by another cryptographic key from another cryptographic key pair and stored with the mobile wallet domain administrator. This allows for a backup of the private key without allowing the mobile wallet domain administrator access to the key (and thus access to the mobile wallet messages). The key used to unlock the first private key may be stored in the mobile wallet application. For reliability, in case the mobile wallet application is erased (e.g, a failure of the computing device it is run on), the mobile wallet may store this key in a key keeper, such as key keeper 2300 of FIG. 2. Key keeper 2300 may be an application on another computing device of the user, a network based application, or the like, which may not be the mobile wallet provider. The transmissions of the key s to the key keeper may be protected through one or more mechanisms such as secure socket layer (SSL) communications and may be protected from unauthorized access through mechanisms such as username and password and two factor authentication. If the mobile wallet loses key s due to device failure or device replacement, it retrieves the second cryptographic key from the key keeper and the encrypted private key from the administrator. The device then recovers the private key by decrypting it using the second cryptographic key.

In some examples, the recipient may verify the identity of the sending mobile wallet. This may be important to maintaining security when processing financial transactions electronically without human intervention. For instance, the recipient mobile wallet may receive a monthly electric bill from a power company and may verify authenticity of the bill by verifying the sender of the bill before making a payment automatically. In some examples, the sender may sign the message with a digital signature. For example, the message is hashed and the hash value is then encrypted with the sender's private key. The sender's public key is then used by the recipient (after having been obtained by the recipient's MTA) to verify the hash of the message. This verifies that the message is from the sender. However, in other examples, an additional verification may be sent. For example, non-public details about the recipient's account may also be sent to provide the recipient with an assurance that the message is genuine. Using these two techniques the recipient may be assured of the sender's legitimacy.

Figure 11:
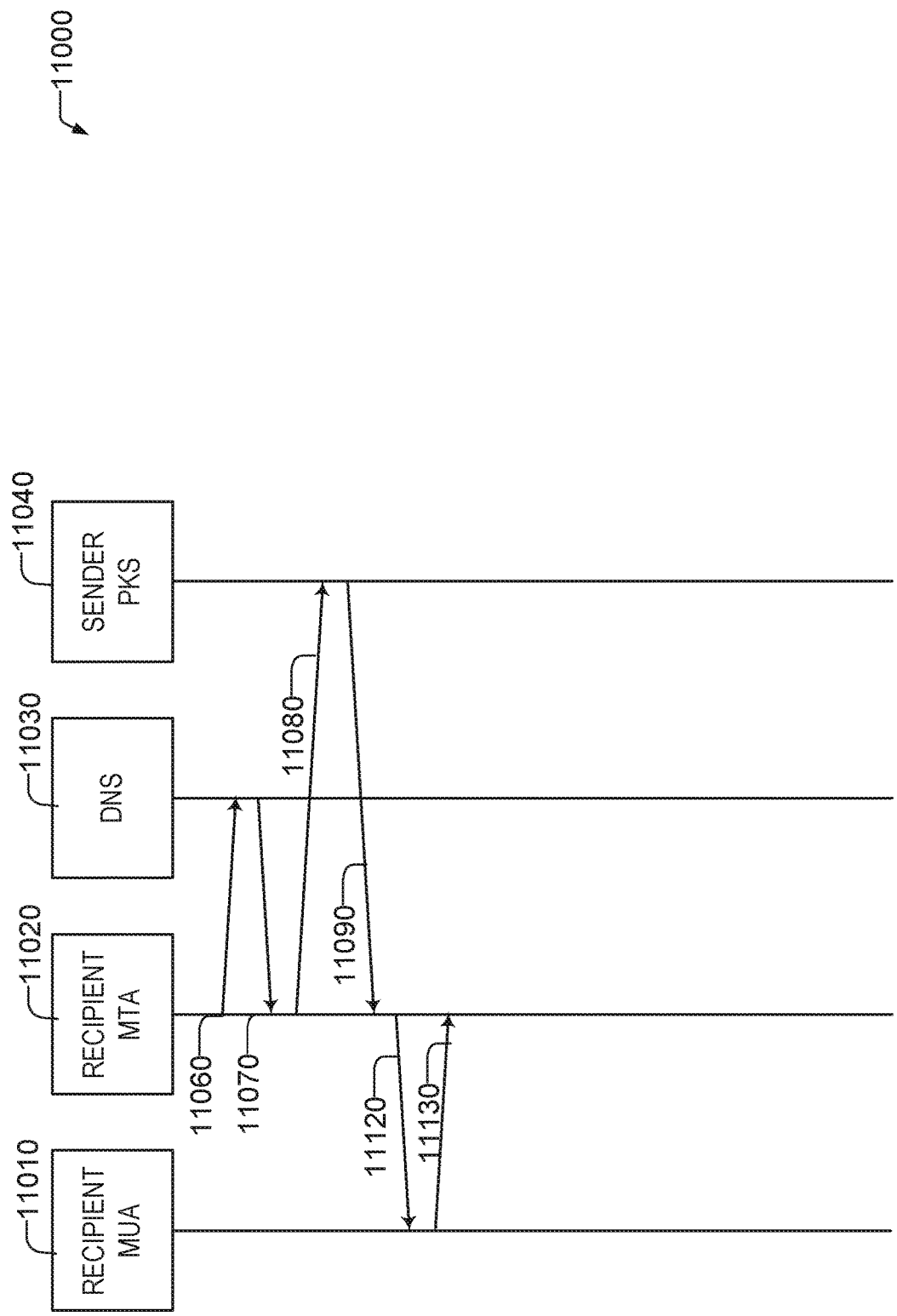
FIG. 11 shows an example message sequence chart of a recipient MTA verifying the authenticity of the sender.

FIG. 11 shows an example message sequence chart 11000 of a recipient MTA verifying the authenticity of the sender. This flow may happen after the MTA receives the message. First the recipient MTA may identify the sender name in the message. Recipient MTA 11020 may send a DNS lookup request 11060 for the sender name identified in the message to DNS 11030 to obtain the IP address of the senders PKS. At operation 11070 the DNS server 11030 responds with the IP address (or an error if the mobile wallet domain was not found—in which case the flow ends). If the IP address of the message sender is different from the IP address of the sender identified in the message, the message may be from a fraudulent sender. For instance, suppose the sender is an imposter of Wells Fargo. When the recipient performs DNS lookup of Wells Fargo, the IP address of Wells Fargo would be different from the imposter's IP address. In other examples, the IP address may be deducible from the received message (e.g, from analysis of IP-packet or mobile wallet message headers) and messages 11060 and 11070 may not be necessary.

The recipient MTA 11020 may then send a request for the public key of the sender from the sender's PKS using message 11080. The sender PKS 11040 may then reply 11090 with the public key. In some examples, the public key provided may be as part of a digital certificate issued by a trusted certificate authority.

Once the recipient MTA 11020 receives the sender's public key, the recipient MTA 11020 may verify the certificate (e.g, if the public key was provided as a digital certificate), decrypt the signature, calculate the message hash and compare the decrypted signature hash with the calculated message hash. If the hashes match, then the message was sent by the sender. If the hashes do not match, it is possible that the sender did not send the message. Message 11120 may be an indication of whether the sender is legitimate. Message 11130 may acknowledge message 11120.

In other examples, the verification is done by the recipient MUA 11010. In these examples message 11120 is the digital certificate or public key. The recipient MUA 11010 may verify the certificate (e.g., if the public key was provided as a digital certificate), decrypt the signature, calculate the message hash and compare the decrypted signature hash with the calculated message hash. If the hashes match, then the message was sent by the sender. If the hashes do not match, it is possible that the sender did not send the message. In either case, the recipient MUA 11010 may inform the user on the results of the verification.

Figure 12:
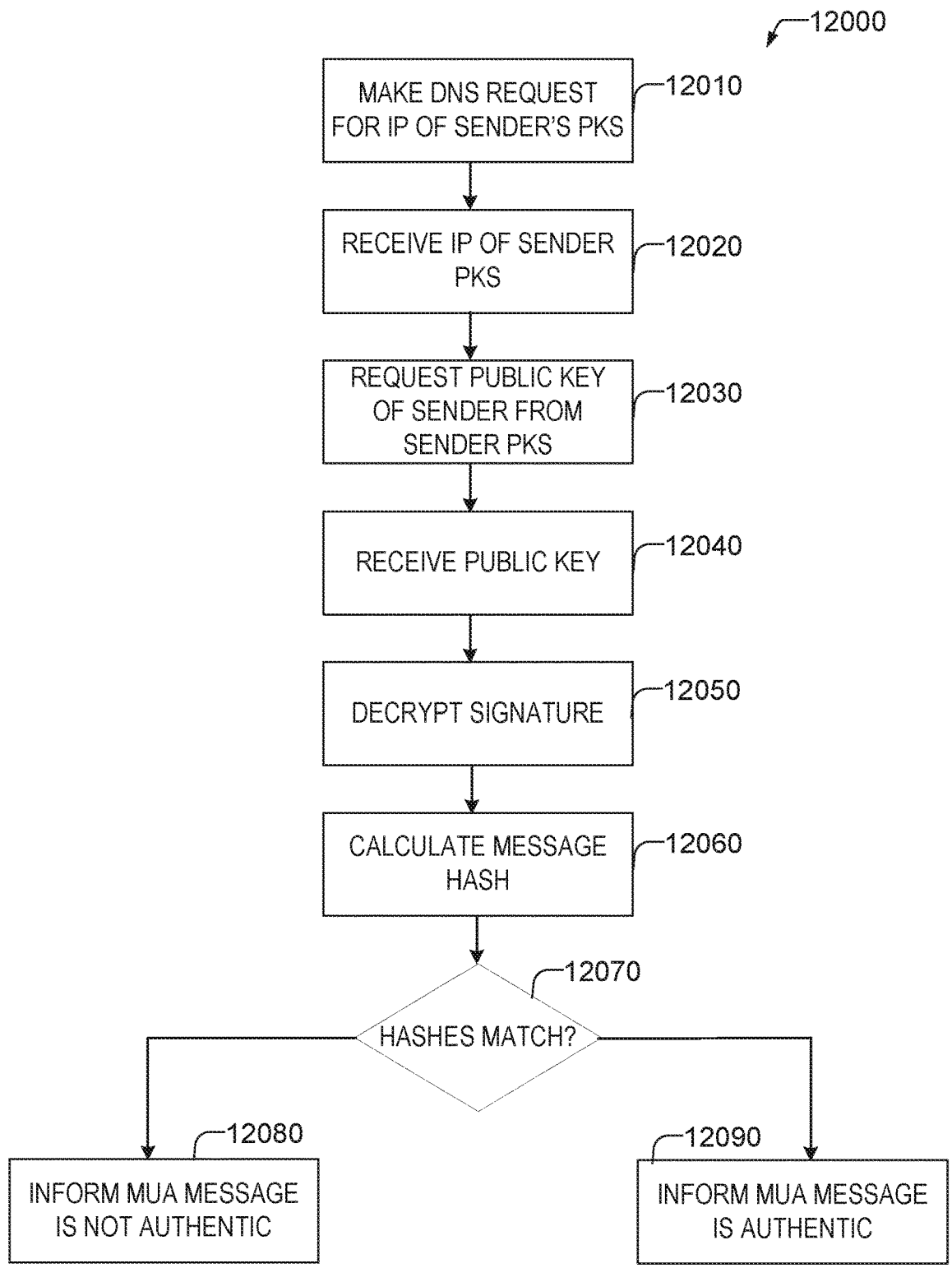
FIG. 12 shows a flowchart of a method for verifying the sender of a mobile wallet message is shown according to some examples of the present disclosure.

Turning now to FIG. 12, a flowchart of a method 12000 for verifying the sender of a mobile wallet message is shown according to some examples of the present disclosure. At operation 12010 the recipient's MTA may request the IP of the sender's PKS. At operation 12020 the recipient's MTA may receive the IP of the sender's PKS. As noted previously, the DNS lookup may not be necessary if the IP Address is available from the original message or from other sources (e.g., a cache).

At operation 12030 the recipient's MTA may request the sender's public key from the PKS of the sender. At operation 12040 the MTA may receive the public key. Also as previously noted, the public key may be in the form of a digital certificate issued by a trusted certificate authority.

Operations 12050-12090 may be performed by either the MTA of the recipient, or the recipient MUA. In some examples, before operations 12050-12090, the public key of the sending MUA may be verified by verifying the digital certificate using the public key of the certificate authority that issued the digital certificate, by verifying it has not expired, and verifying that the identity of the user is as stated by the sender.

At operation 12050 the signature of the message may be decrypted. At operation 12060 a cryptographic hash value of the message may be computed using a cryptographic hash function. The sender had calculated the cryptographic hash utilizing the same hashing function, encrypted it with its private key (which only the sender has, and only the valid public key can decrypt) as the signature, and sent it to the recipient. If the signature is decrypted with the public key and matches the correct cryptographic hash, then the recipient can be assured that the message came from the person holding the private key matching the public key registered with the PKS and verified by the CA. Example cryptographic hash functions include MD5, SHA-1, SHA-2, SHA-3, BLAKE, BLAKE2, and the like. At operation 12070 if the hash in the message matches the computed hash value, then at operation 12090 the MTA may notify the MUA that the message is authentic. At operation 12080, if the hash in the message does not match the computed hash value, then the MTA may inform the MUA that the message is not authentic (and may be considered suspicious).

While the above procedure ensures that the entity that sent the message also knows the private key of the public key associated with the entity, it is possible that the private key was compromised. In order to add another layer of security, in some examples an application layer security mechanism may be added. In this layer, the MUA of the recipient may require the MUA of the sender to provide certain verification information. For example, the MUA of recipient may request information known to both the MUA of the sender and MUA of the recipient. If the MUA of the sender provides this information (in either the original message, or as part of a challenge response sequence) and it is correct, the MUA of the recipient may determine that the sender is legitimate. Example information may include one or more of: bank account information (account numbers, balances, account holder personal information such as name, address, phone number), transaction information (e.g., transaction dates, amounts, parties), driver's license information, user information, and a secret phrase (e.g., a predetermined data field). The information requested may be standardized, such that the sender may provide this information as part of the message; or may be requested by the MUA of the recipient.

Both levels of verification (e.g., verifying the signature of the sender, as well as application-layer verifications) may be performed automatically, or may be performed at the request of the recipient. In some examples, certain types of messages (e.g., certain mobile wallet messages such as transactions) may automatically trigger one or both of the verification layers. In some examples, a table may indicate whether no verification, signature verification, application layer verification, or both signature and application layer verification is to be performed based upon one or more of: the type of mobile wallet message, a text content of the mobile wallet message, a sender of the mobile wallet message, or the like.

Figure 13:
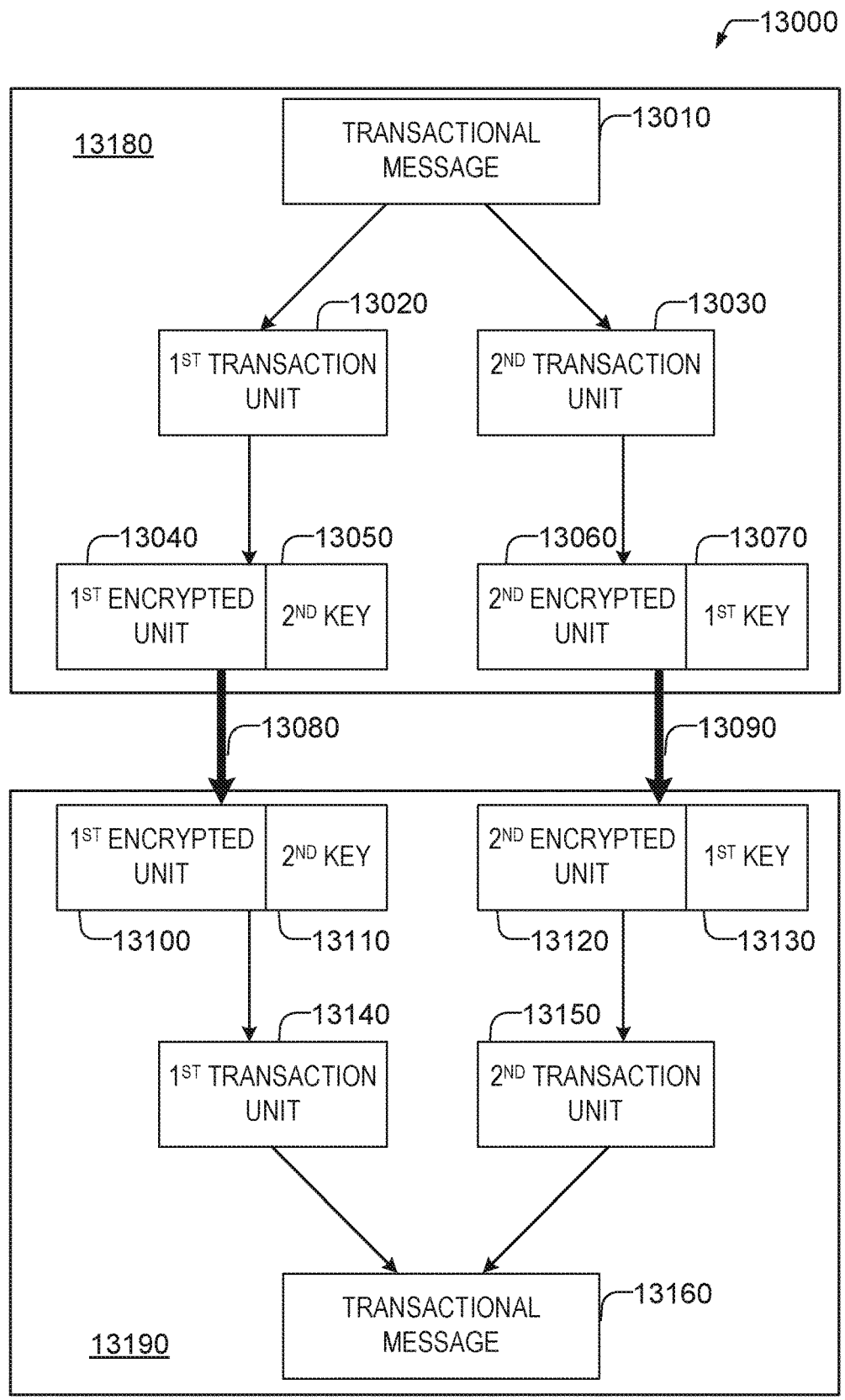
FIG. 13 shows an example message sequence chart of a secured transmission of a mobile wallet message from a sender to a recipient.
Figure 14:
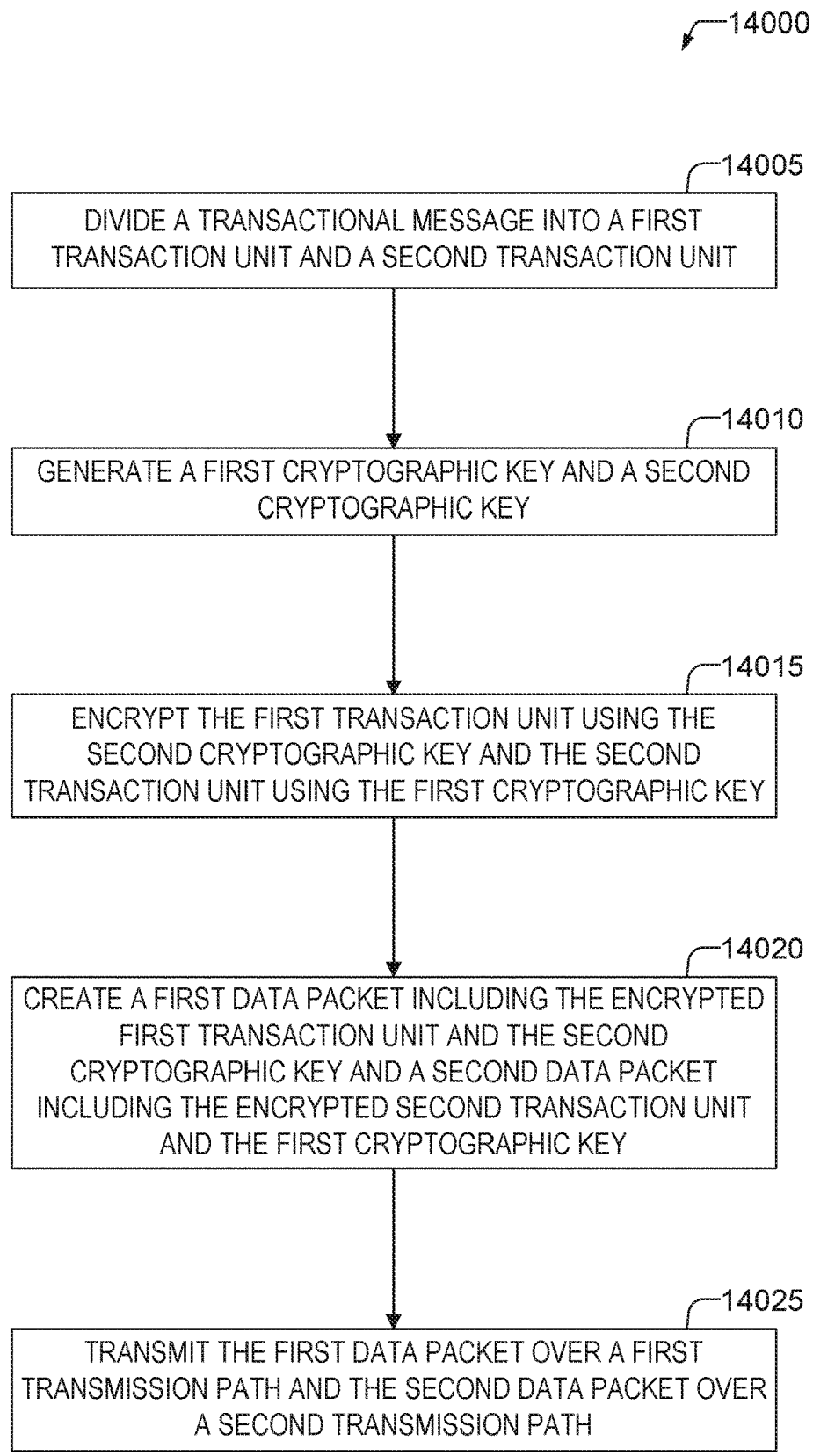
FIG. 14 shows a flowchart of a method for securing mobile wallet message transmissions between a sender and a recipient according to some examples of the present disclosure.

Mobile wallets may use alternative security scheme in some cases to maintain the integrity of transmitted messages. For instance, a sender mobile wallet may discover that there is no public key published by the recipient mobile wallet in the process of DNS lookup. The sender may still want to send a message with some protection against the man-in-the-middle attack. FIGS. 13-15 illustrate an example of a security scheme for securing messages transmitted between mobile wallets, according to some embodiments.

FIG. 13 shows an example message sequence chart 13000 of a secured transmission of a mobile wallet message from a sender to a recipient. A first mobile wallet (sender) 13180 may compose a transactional message 13010 and may divide it into a first transaction unit 13020 and a second transaction unit 13030. The first transaction unit 13020 may include a first half of the transactional message and the second transaction unit 13030 may include a second half of the message. In an example, the first transaction unit 13020 may include odd lines of the transactional message 130101 and the second transaction unit 13030 may include even lines of the transactional message 130101. It will be recognized that the transactional message 13010 may be divided in a variety of other way s.

The first mobile wallet 13180 may create two different cryptographic keys and may encrypt the first transaction unit 13020 with a first key 13070 to produce a first encrypted unit 13040 and may encrypt the second transaction unit 13030 with a second key 13050 and may produce a second encrypted unit 13060. The first mobile wallet 13180 may produce a first packet by combining the first encrypted unit 13040 and the second key 13050 and may produce a second packet by combining the second encrypted unit 13060 and the first key 13070. Each packet may specify the relationship with the other packet. The first mobile wallet 13180 may transmit the first packet using a first communication path 13080 and may transmit the second packet using a second communication path 13090. The first communication path 13080 is different from the second communication path 13090. For example, the first communication path 13080 and the second communication path 13090 may operate on two different wireless media or two different underlying networks (e.g., separate network backbones, etc.). For example, the first communication path 13080 may be a cellular network and the second communication path 13090 may be a Wi-Fi network. In another example, the first communication path 13080 may be a telephone company network and the second communication path 13090 may be the Internet.

The second mobile wallet (recipient) 13190 may receive the first packet via the first communication path 13080 and the second packet via the second communication path 13090. The second mobile wallet 13190 may decrypt the first encrypted unit 13100 included in the first packet using the first cryptographic key 13130 and may decrypt the second encrypted unit 13120 included in the second packet using second key 13110 and may produce a first transaction unit 13140 and a second transaction unit 13150 and may combine the first transaction unit 13140 and the second transaction unit 13150 into a transactional message 13160.

In some examples, the first mobile wallet 13180 may divide the transactional message 13010 into more than two units, encrypt each unit using a different cryptographic key for each unit, and send each data unit over two or more communication paths at different time intervals. In an example, each unit may be numbered or their relationships may be defined to enable recombination.

If one of the packets is lost on the way, the second mobile wallet 13190 may transmit a request to the first mobile wallet 13180 to retransmit the data packets. In an example, the first mobile wallet 13180 may use a different division technique and may use different encryption key s from the first attempt to insure the security of the second attempt.

A recipient may receive a first encrypted segment of the transactional message and may need a cryptographic key included in a packet with a second encrypted segment of the transactional message. Because each segment is encrypted with a key included in another segment and each segment is transmitted over a different communication path at a different time interval, the likelihood of the message being intercepted or compromised (e.g., via a man-in-the-middle attack, etc.) may be reduced.

FIG. 14 shows a flowchart of a method 14000 for securing mobile wallet message transmissions between a sender and a recipient according to some examples of the present disclosure.

At operation 14005, a first mobile wallet (e.g., mobile wallet application 2060 as described in FIG. 2) may divide a transactional message into a first transaction unit and a second transaction unit. In an example, the first mobile wallet may determine a first half and a second half of the transactional message and may include the first half in the first transaction unit and may include the second half in the second transaction unit. In another example, the first mobile wallet may extract odd lines and even lines from the transactional message and may include the odd lines in the first transaction unit and may include the even line in the second transaction unit.

At operation 14010, the first mobile wallet may generate (e.g., using the key manager 2080 as described in FIG. 2) a first cryptographic key and a second cryptographic key. In an example, the first cryptographic key and the second cryptographic key may be different.

At operation 14015, the first mobile wallet may encrypt (e.g., using the MUA 2075 as described in FIG. 2) the first transaction unit using the second cryptographic key and the second transaction unit using the first cryptographic key.

At operation 14020, the first mobile wallet may create (e.g., using the MUA 2075 as described in FIG. 2) a first data packet including the encrypted first transaction unit and the second cryptographic key and a second data packet including the encrypted second transaction unit and the first cryptographic key. In an example, the first data packet may include a reference to the second data packet and the second data packet may include a reference to the first data packet.

At operation 14025, the first mobile wallet may transmit (e.g., using the MUA 2075 as described in FIG. 2) the first data packet over a first transmission path and the second data packet over a second transmission path. In an example, the first transmission path may use a first wireless protocol and the second transmission path may use a second wireless protocol. In another example, the first transmission path may use a first physical network and the second transmission path may use a second physical network. In another example, the first transmission path may use a cellular network and the second communication path may use a Wi-Fi network. In another example, the first communication path may use a telephone company network and the second transmission path may use an internet connection.

In some examples, the first mobile wallet may receive a request from a second mobile wallet (e.g., mobile wallet application 2070 as described in FIG. 2) indicating that one of the first data packet and the second data packet was not received. The first mobile wallet may retransmit the first data packet and the second data packet in response to the request. In an example, the first mobile wallet may generate a third cryptographic key and a fourth cryptographic key and may encrypt the first transaction unit using the fourth cryptographic key and the second transaction unit using the third cryptographic key before retransmitting the first data packet and the second data packet.

FIG. 15 shows a flowchart of a method 15000 for securing mobile wallet message transmissions between a recipient and a sender according to some examples of the present disclosure.

At operation 15005, a mobile wallet user agent (MUA) of second mobile wallet (e.g., the MUA 2260 of mobile wallet application 2070 as described in FIG. 2) may receive a first data packet over a first transmission path and a second data packet over a second transmission path, the first data packet including a first encrypted transaction unit and a second cryptographic key and the second data packet including a second encrypted transaction unit and a first cryptographic key. In an example, the first data packet may include a reference to the second data packet and the second data packet may include a reference to the first data packet. In an example, the first transmission path may use a first wireless protocol and the second transmission path may use a second wireless protocol. In another example, the first transmission path may use a first physical network and the second transmission path may use a second physical network. In another example, the first transmission path may uses a cellular network and the second communication path may use a Wi-Fi network. In another example, the first communication path may use a telephone company network and the second transmission path may use an internet connection.

At operation 15010, the MUA may decrypt (e.g., using the key manager 2290 as described in FIG. 2, etc.) the first encrypted transaction unit using the second cryptographic key and the second encrypted transaction unit using the first cryptographic key.

At operation 15015, the MUA may combine the first decrypted transaction unit and the second decrypted transaction unit into a transactional message.

At operation 15020, the MUA may forward the transactional message to the second mobile wallet for further processing.

In some examples, the MUA may determine that only one data packet of the first data packet and the second data packet has been received. The MUA may transmit a request to resend the first data packet and the second data packet to a sender (e.g, mobile wallet application 2060 as described in FIG. 2) of the only data packet. The MUA may receive the first data packet and the second data packet in response to the request.

Figure 16:
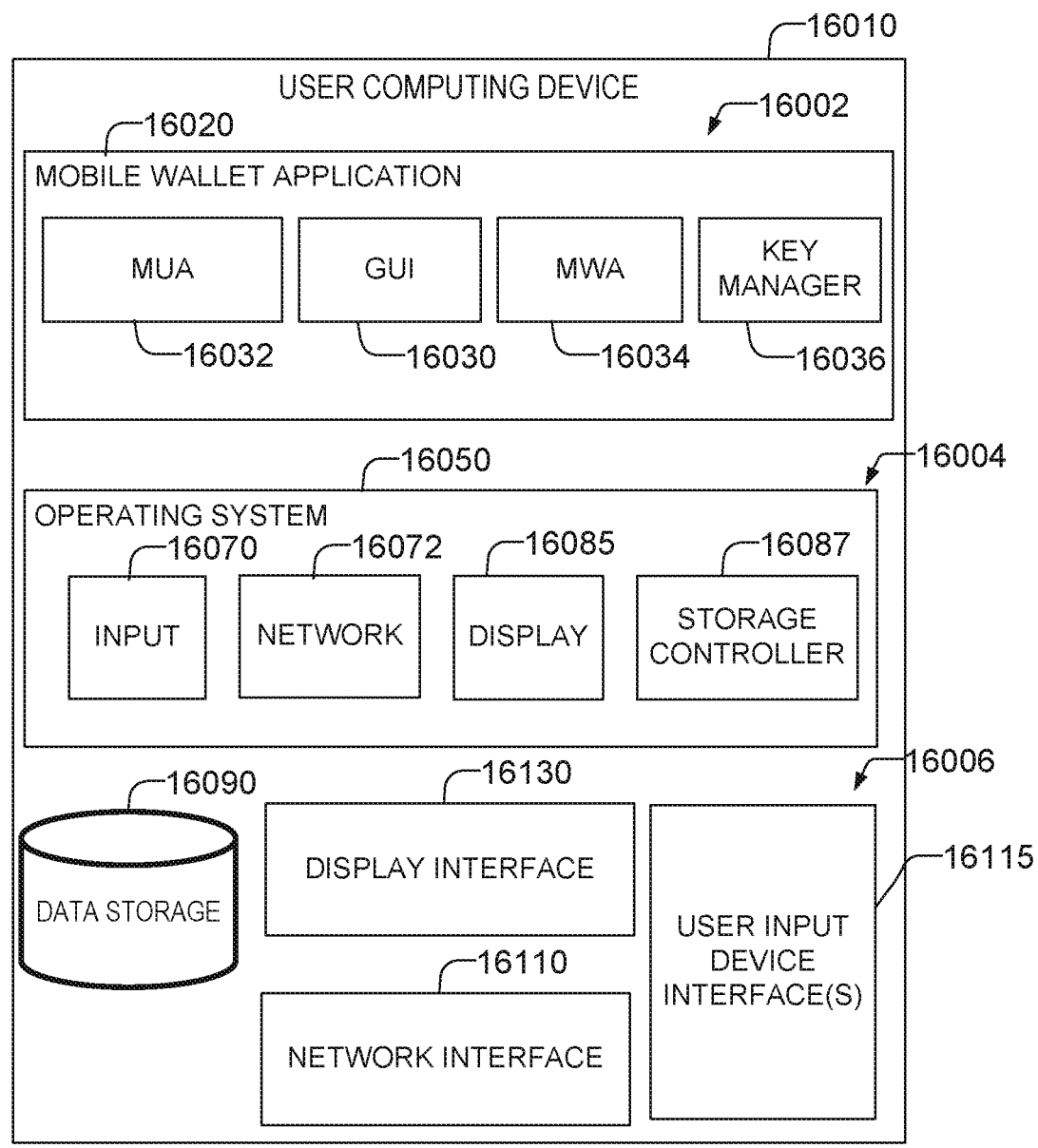
FIG. 16 shows a schematic of a logical diagram of a user computing device according to some examples of the present disclosure.

FIG. 16 illustrates a schematic of a logical diagram of a user computing device 16010 according to some examples of the present disclosure. For example, user computing device 16010 may, in some examples, be an embodiment of computing devices 1040, 1050, 2040, and 2050. User computing device 16010 may implement a sender MUA 3010, a recipient MUA 4010, or a recipient MUA 11010. User computing device 16010 may implement FIGS. 5, 10, and portions of FIGS. 12, 14, and 15. User computing device 16010 may be a desktop computer, laptop computer, tablet computer, mobile phone, smartphone, computer server, or wearable. User computing device may have a hardware layer 16006 including display interface 16130, network interface 16110, user input device interface(s) 16115, and data storage 16090. User computing device 16010 may have an operating system layer 16004 with one or more operating system(s) such as operating system 16050. Operating system 16050 may have, among other modules, an input module 16070, a network module 16072, a display module 16085, and a storage controller module 16087. User computing device may have an application layer 16002. Application layer 16002 may have many applications, but as shown, application layer includes a mobile wallet application 16020. User computing device may have other layers (such as a Basic Input and Output System (BIOS), Unified Extensible Firmware Interface (UEFI), Firmware layer), and the like which are not shown for clarity.

Included in mobile wallet application 16020 is MUA module 16032 which implements the mobile wallet user agent, such as MUA 2075, 2260, 3010, 4010, 11010, and implements the methods of FIG. 5, 10, and all of, or portions of FIG. 12. MUA module 16032 may provide one or more graphical user interfaces for creating editing sending or reading mobile wallet messages. MUA module 16032 may also provide for communicating with one or more MTA's to obtain encryption keys of recipient mobile wallets, encrypting one or more messages with obtained encryption keys, sending one or more messages (e.g, encrypted messages) to the one or more MTA's, receiving notifications that one or more messages sent to the MUA are available at an MSA, retrieving the one or more messages from the MSA, decrypting the one or more messages, managing the public and private key s of the mobile wallet, and the like. MUA module 16032 may interface with the GUI module 16030 to provide one or more GUIs to facilitate the mobile wallet messaging MUA module 16032 may also interface with the input module 16070 of operating system 16050 to receive user input from devices connected to the user computing device 16010 through user input device interface(s) 16115 and with display module 16085 to provide output to the user through display interface 16130 in providing these GUIs.

Mobile Wallet Application (MWA) module 16034 provides for storing managing and using items in the mobile wallet. For example, MWA module 16034 may, upon input from the user, transmit one or more payment authorizations to other devices, transmit identification information to other users, store, modify, or delete items in a user's wallet, and the like. MWA module 16034 may also work with GUI module 16030 to provide one or more GUIs to facilitate the management of the mobile wallet by interfacing with the input module 16070 and display module 16085.

Also included in mobile wallet applications 16020 is a GUI module 16030 which, as noted, may work with display module 16085, input module 16070, MUA module 16032, and MWA module 16034 to provide one or more GUIs for allowing users to use their mobile wallet and to send messages from and receive messages to their mobile wallets. For example, GUI module 16030 may allow users to view representations of the contents of their mobile wallets, edit their mobile wallets, add items, remove items, modify items, use items (e.g, for payment, for identification, and the like), and send and receive messages to and from other mobile wallets. Key manager module 16036 may obtain, store, and manage one or more cryptographic key s or key pairs. Key manager module 16036 may be an embodiment of key manager 2080 and 2290. Key manager module 16036 may work with the storage controller 16087 to store keys in the data storage 16090. Key manager module 16036 may also work with storage controller module 16087 to obtain keys, certificates, or other cryptographic items from one or more remote servers.

Operating system layer 16004 provides one or more services to the application layer 16002 and manages hardware in the hardware layer 16006. Example tasks performed by the operating system layer 16004 includes providing one or more device drivers which manages hardware and provides one or more interfaces for applications in the application layer 16002 to utilize the hardware in the hardware layer 16006. Other tasks performed by the operating system layer 16004 include memory management, task scheduling resource management, optimizations, security, and other tasks.

Input module 16070 is a device driver that manages user input device interface(s) 16115 and provides input sensed by devices connected to the user input device interface(s) 16115 to interested modules in the operating system layer 16004 and interested applications in the application layer 16002. Display module 16085 is a device driver that manages display interface 16130 and provides modules in the operating system layer 16004 and applications in application layer 16002 access to displays connected to the display interface 16130. Storage controller module 16087 is a device driver that manages data storage 16090 and provides modules in the operating system layer 16004 and applications in application layer 16002 access to store and retrieve data in data storage 16090. For example, storage controller module 16087 may provide mobile wallet application(s) 16020 with access to data storage 16090 for storing messages, storing cryptographic key s (e.g, key manager 16036 may store keys for the user of mobile wallet application(s) or may cache one or more public key s of other mobile wallet users to avoid asking the MTA for keys, and the like), etc.

Network module 16072 is a device driver for the network interface 16110. Network module 16072 may manage network interface 16110 and provide network access to modules in the operating system layer 16004 and application layer 16002. Network module 16072 may implement one or more network protocols, such as Transmission Control Protocol (TCP), Internet Protocol (IP), 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 16090 may be any type of non-transitory storage, such as Random Access Memory (RAM), Solid State Drives (SSD), Hard Disk Drivers (HDD), magnetic storage, and optical storage. Display interface 16130 may be graphics hardware that connects to a Cathode Ray Tube (CRT), a Liquid Crystal Display (LCD), a Light Emitting Diode (LED) display, an Organic LED display, or the like. Display interface 16130 may be coupled to one or more user input devices to form a touch screen display. User input device interface(s) 16115 may be any interface to a user input device. Examples include Universal Serial Bus (USB), Serial ATA (SATA), Peripheral Component Interconnect Express (PCI-E), and the like. Input devices that may connect to the user input device interface(s) 16115 may include touch sensors (e.g, in a touch screen display), a keyboard, a mouse, a trackpad, a touchpad, and the like. Network interface 16110 may provide user computing device 16010 with access to one or more computer networks. Network interface 16110 may be an Ethernet card, a Wireless Local Area Network (WLAN) card, a Radio Frequency Transmitter, or the like.

Figure 17:
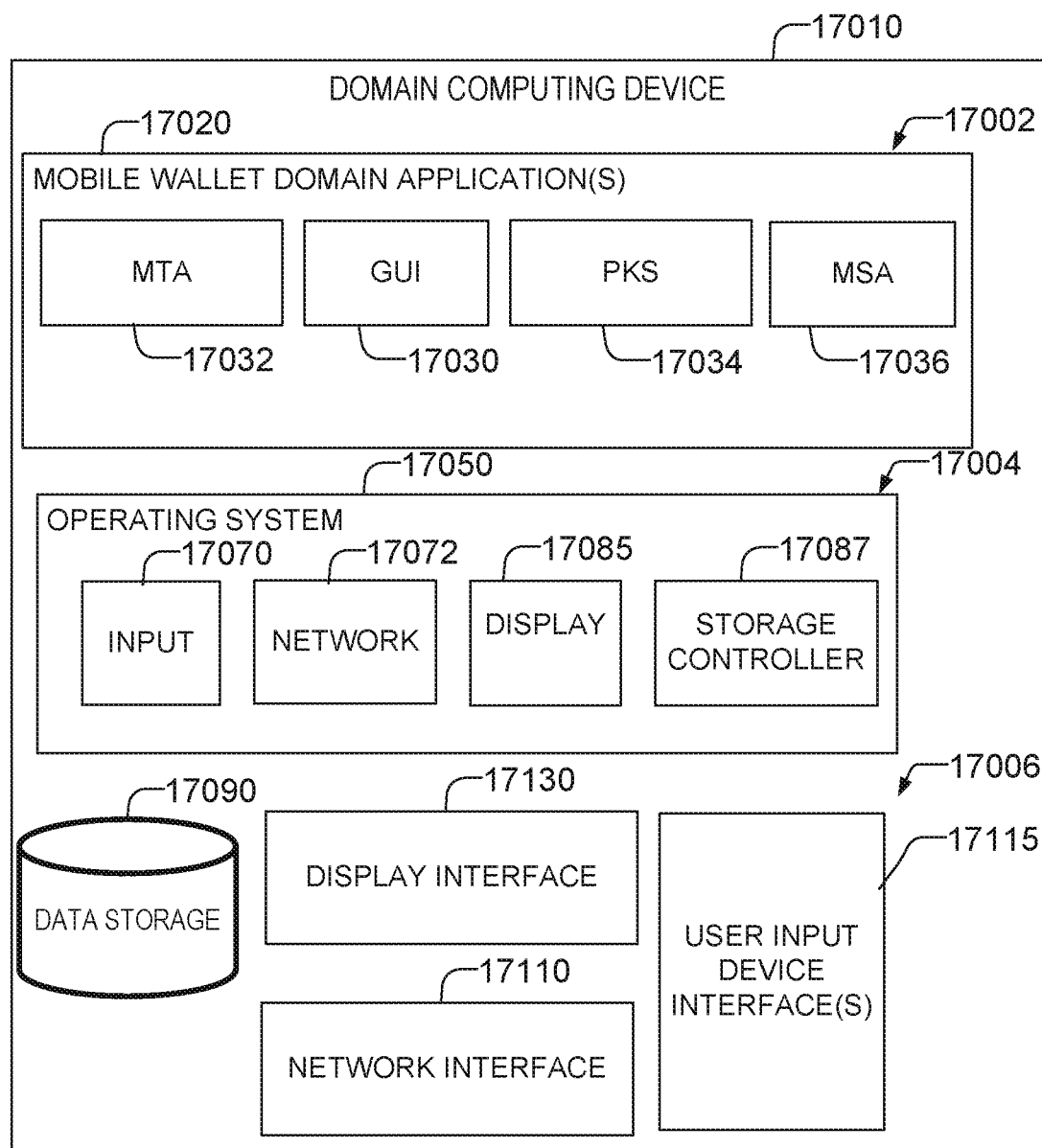
FIG. 17 shows a schematic of a mobile wallet domain computing device according to some examples of the present disclosure.

FIG. 17 illustrates a schematic of a mobile wallet domain computing device 17010 according to some examples of the present disclosure. Mobile wallet domain computing device 17010 may perform the role of one or more of: MTA, PKS, and MSA. For example, one mobile wallet domain computing device 17010 may perform all of these roles, or multiple mobile wallet domain computing devices 17010 may perform these roles. Mobile wallet domain computing device 17010 may be an example of provider 1120, 1130 mobile wallet element issuer 1160, mobile wallet providers 2110, 2210, sender MTA 3020, recipient PKS 3040, recipient MTA 3060, recipient MSA 3070, recipient MTA 11020, sender PKS 11040, and the like. Mobile wallet domain computing device 17010 may perform the methods of one or more of FIGS. 6, 7, 8, 9, and portions or all of FIGS. 12, 14, and 15.

Mobile wallet domain computing device 17010 may be a desktop computer, laptop computer, tablet computer, mobile phone, smartphone, computer server, or wearable. Mobile wallet domain computing device may have a hardware layer 17006 including display interface 17130, network interface 17110, user input device interface(s) 17115, and data storage 17090. Mobile wallet domain computing device 17010 may have an operating system layer 17004 with one or more operating system(s) such as operating system 17050. Operating system 17050 may have, among other modules, an input module 17070, a network module 17072, a display module 17085, and a storage controller module 17087. Mobile wallet domain computing device may have an application layer 17002. Application layer 17002 may have many applications, but as shown, application layer includes mobile wallet domain applications 17020.

Included in mobile wallet domain application(s) 17020 is MTA module 17032 which may determine one or more public key s of one or more recipient mobile wallet applications, determine IP addresses of one or more recipient mobile wallet domain PKS' and MTAs, forward one or more mobile wallet messages to one or more other MTAs, and receive one or more mobile wallet messages from other MTAs where a mobile wallet application within the mobile wallet domain as the MTA is the recipient. MTA module 17032 may be an example implementation of MTA module 2100, 2200, 3020, 3060, 11020 and may implement FIGS. 6, 7, 8, and portions of FIGS. 12, 14, and 15.

Mobile wallet domain application(s) 17020 may also include PKS module 17034 which may manage and provide one or more public keys of mobile wallet users within the mobile wallet domain. PKS module 17034 may store, manage, and distribute public keys of mobile wallet applications within its mobile wallet domain. PKS module may be one example embodiment of PKS 2115, 2170, 3040, 11040, and may implement operations to receive a request from a MTA, the request including an address, determine from the address whether there is a public key matching the address stored in the PKS, and if there is a matching public key, send the public key back to the requesting MTA. If there is not a matching public key, send an error back to the requesting MTA.

Mobile wallet domain application(s) 17020 may also include an MSA module 17036. The MSA module 17036 may be an example embodiment of MSA 2230, 3070 and may perform the operations of FIG. 9. GUI module 17030 provides one or more GUIs and other user interfaces to users to provide for administration of the mobile wallet domain applications. GUI module 17030 may work with the display module 17085 of the operating system to provide a GUI for output on a display connected to display interface 17130.

Operating system layer 17004 provides one or more services to the application layer 17002 and manages hardware in the hardware layer 17006. Example tasks performed by the operating system layer 17004 includes providing one or more device drivers which manages hardware and provides one or more interfaces for applications in the application layer 17002 to utilize the hardware in the hardware layer 17006. Other tasks performed by the operating system layer 17004 include memory management, task scheduling resource management, optimizations, security, and other tasks.

Input module 17070 is a device driver that manages user input device interface(s) 17115 and provides input sensed by devices connected to the user input device interface(s) 17115 to interested modules in the operating system layer 17004 and interested applications in the application layer 16002. Display module 17085 is a device driver that manages display interface 17130 and provides modules in the operating system layer 17004 and applications in application layer 17002 access to displays connected to display interface 17130. Storage controller module 17087 is a device driver that manages data storage 17090 and provides modules in the operating system layer 17004 and applications in application layer 17002 access to store and retrieve data in data storage 17090.

Network module 17072 is a device driver for the network interface 17110. Network module 17072 may manage network interface 17110 and provide network access to modules in the operating system layer 17004 and application layer 17002. Network module 17072 may implement one or more network protocols, such as Transmission Control Protocol (TCP), Internet Protocol (IP), 802 series protocols promulgated by the Institute of Electrical and Electronics Engineers (IEEE) including 802.11 protocols and 802.3 protocols, cellular protocols such as those promulgated by the Third Generation Partnership Project (3GPP) including Long Term Evolution (LTE) protocols and Long Term Evolution-Advanced (LTE-A) protocols, and others.

Data storage 17090 may be any type of non-transitory storage, such as Random Access Memory (RAM), Solid State Drives (SSD), Hard Disk Drivers (HDD), magnetic storage, and optical storage. Display interface 17130 may be graphics hardware that connects to a Cathode Ray Tube (CRT), a Liquid Crystal Display (LCD), a Light Emitting Diode (LED) display, an Organic LED display, or the like. Display interface 17130 may be coupled to one or more user input devices to form a touch screen display. User input device interface(s) 17115 may be any interface to a user input device. Examples include Universal Serial Bus (USB), Serial ATA (SATA), Peripheral Component Interconnect Express (PCI-E), and the like. Input devices that may connect to the user input device interface(s) 17115 may include touch sensors (e.g, in a touch screen display), a keyboard, a mouse, a trackpad, a touchpad, and the like. Network interface 17110 may provide mobile wallet domain computing device 17010 with access to one or more computer networks. Network interface 17110 may be an Ethernet card, a Wireless Local Area Network (WLAN) card, a Radio Frequency Transmitter, or the like.

Figure 18:
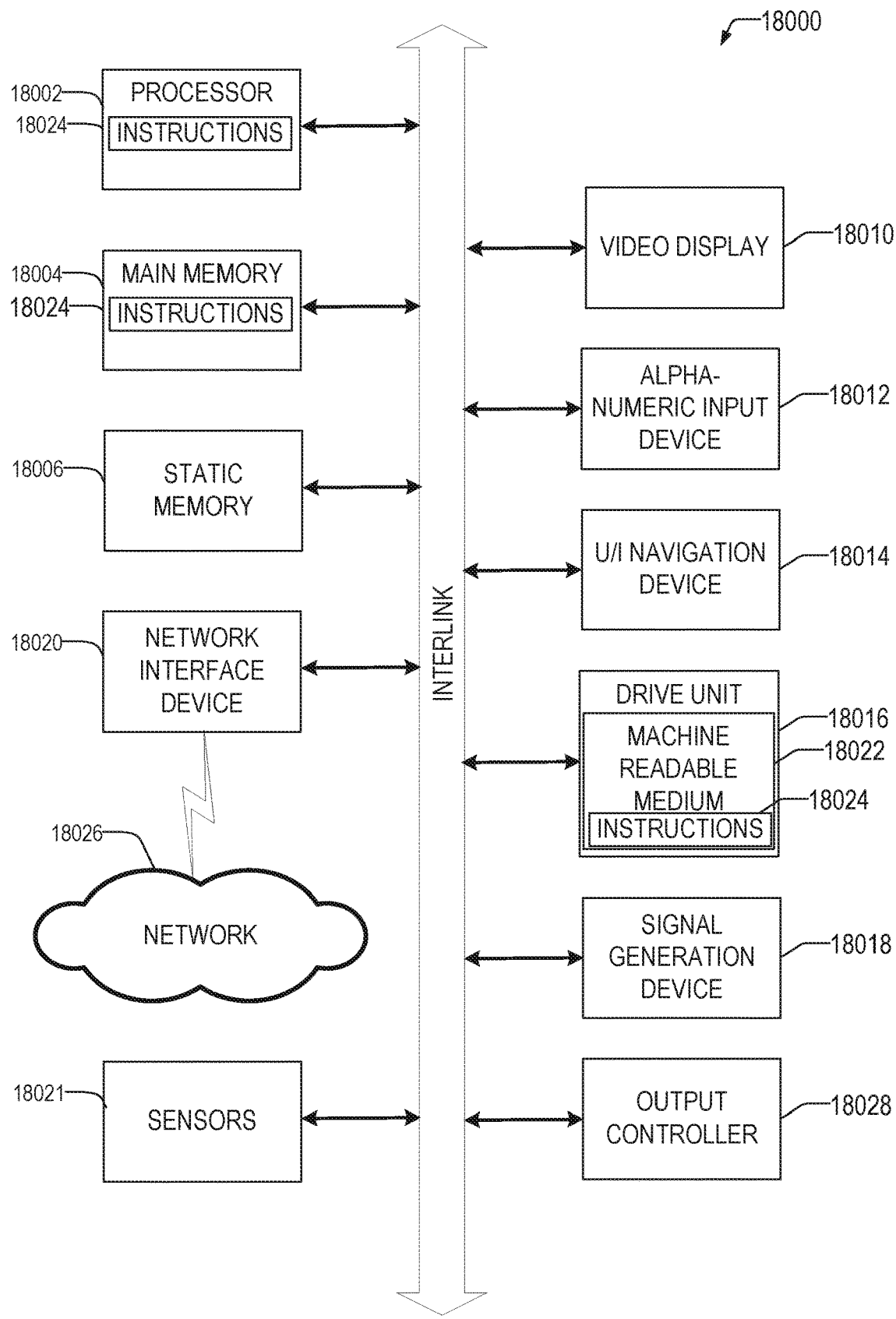
FIG. 18 is a block diagram illustrating an example of a machine upon which one or more embodiments may be implemented.

FIG. 18 illustrates a block diagram of an example machine 18000 upon which any one or more of the techniques (e.g, methodologies) discussed herein may perform. In alternative embodiments, the machine 18000 may operate as a standalone device or may be connected (e.g, networked) to other machines. In a networked deployment, the machine 18000 may operate in the capacity of a server machine, a client machine, or both in server-client network environments. In an example, the machine 18000 may act as a peer machine in peer-to-peer (P2P) (or other distributed) network environment. The machine 18000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 18000 may function as an MUA, MTA, computing device executing a mobile wallet application, DNS, CA, PKS, Key Manager, Key Keeper, or the like. For example, the Machine 18000 may be configured to perform any of the operations of FIGS. 5-10, 12, and 14. Further, while only a single machine is illustrated, the term "machine" shall also be taken to include any collection of machines that individually or jointly execute a set (or multiple sets) of instructions to perform any one or more of the methodologies discussed herein, such as cloud computing software as a service (SaaS), other computer cluster configurations.

Examples, as described herein, may include, or may operate on, logic or a number of components, modules, or mechanisms. Modules are tangible entities (e.g, hardware) capable of performing specified operations and may be configured or arranged in a certain manner. In an example, circuits may be arranged (e.g, internally or with respect to external entities such as other circuits) in a specified manner as a module. In an example, the whole or part of one or more computer systems (e.g, a standalone, client or server computer system) or one or more hardware processors may be configured by firmware or software (e.g, instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g, hardwired), or temporarily (e.g, transitorily) configured (e.g, programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g, computer system) 18000 may include a hardware processor 18002 (e.g, a central processing unit (CPU), a graphics processing unit (GPU), a hardware processor core, or any combination thereof), a main memory 18004 and a static memory 18006, some or all of which may communicate with each other via an interlink (e.g, bus) 18008. The machine 18000 may further include a display unit 18010, an alphanumeric input device 18012 (e.g, a keyboard), and a user interface (UI) navigation device 18014 (e.g, a mouse). In an example, the display unit 18010, input device 18012 and UI navigation device 18014 may be a touch screen display. The machine 18000 may additionally include a storage device (e.g, drive unit) 18016, a signal generation device 18018 (e.g, a speaker), a network interface device 18020, and one or more sensors 18021, such as a global positioning system (GPS) sensor, compass, accelerometer, or other sensor. The machine 18000 may include an output controller 18028, such as a serial (e.g, universal serial bus (USB), parallel, or other wired or wireless (e.g, infrared (IR), near field communication (NFC), etc.) connection to communicate or control one or more peripheral devices (e.g, a printer, card reader, etc.).

The storage device 18016 may include a machine readable medium 18022 on which is stored one or more sets of data structures or instructions 18024 (e.g, software) embodying or utilized by any one or more of the techniques or functions described herein. The instructions 18024 may also reside, completely or at least partially, within the main memory 18004, within static memory 18006, or within the hardware processor 18002 during execution thereof by the machine 18000. In an example, one or any combination of the hardware processor 18002, the main memory 18004, the static memory 18006, or the storage device 18016 may constitute machine readable media.

While the machine readable medium 18022 is illustrated as a single medium, the term "machine readable medium" may include a single medium or multiple media (e.g, a centralized or distributed database, and/or associated caches and servers) configured to store the one or more instructions 18024.

The term "machine readable medium" may include any medium that is capable of storing encoding or carrying instructions for execution by the machine 18000 and that cause the machine 18000 to perform any one or more of the techniques of the present disclosure, or that is capable of storing encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g, Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 18024 may further be transmitted or received over a communications network 18026 using a transmission medium via the network interface device 18020. The Machine 18000 may communicate with one or more other machines utilizing any one of a number of transfer protocols (e.g, frame relay, internet protocol (P), transmission control protocol (TCP), user datagram protocol (UDP), hypertext transfer protocol (HTTP), etc.). Example communication networks may include a local area network (LAN), a wide area network (WAN), a packet data network (e.g, the Internet), mobile telephone networks (e.g. cellular networks), Plain Old Telephone (POTS) networks, and wireless data networks (e.g, Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 18020 may include one or more physical jacks (e.g, Ethernet, coaxial, or phone jacks) or one or more antennas to connect to the communications network 18026. In an example, the network interface device 18020 may include a plurality of antennas to wirelessly communicate using at least one of singe-input multiple-output (SIMO), multiple-input multiple-output (M IMO), or multiple-input singe-output (MISO) techniques. In some examples, the network interface device 18020 may wirelessly communicate using Multiple User MIMO techniques.

OTHER NOTES AND EXAMPLES

Example 1 is a method for secure mobile wallet communications, the method comprising receiving over a network from a mobile wallet user agent (MUA) of a mobile wallet application executing on a computing device of a user, a message addressed to a recipient mobile wallet application in a recipient mobile wallet domain, the recipient mobile wallet domain a top level domain that is specific to mobile wallet applications; determining an IP address of a message transfer agent (MTA) of the recipient mobile wallet domain; and sending the message to the MTA of the recipient mobile wallet domain, the MTA of the recipient mobile wallet domain to forward the message to the recipient mobile wallet application.

In Example 2, the subject matter of Example 1 optionally includes receiving a request for a public key of a recipient mobile wallet from the MUA; determining an Internet Protocol (IP) address of a public key server (PKS) of the recipient mobile wallet domain; requesting the public key of the recipient mobile wallet application from the PKS; receiving the public key of the recipient mobile wallet from the PKS; and sending the public key to the MUA, wherein the message is encrypted with the public key of the recipient mobile wallet.

In Example 3, the subject matter of Example 2 optionally includes wherein the public key is part of a digital certificate provided by a certificate authority.

In Example 4, the subject matter of Example 3 optionally includes wherein the method comprises: authenticating the digital certificate prior to sending the public key to the MUA.

In Example 5, the subject matter of any one or more of Examples 1-4 optionally include wherein determining the IP address of the MTA comprises conducting a Domain Name Server (DNS) query with a DNS server.

In Example 6, the subject matter of any one or more of Examples 1-5 optionally include wherein determining the IP address of the MTA comprises determining the IP address from a DNS cache.

In Example 7, the subject matter of any one or more of Examples 1-6 optionally include receiving a request for a public key of a recipient mobile wallet from the MUA; determining an Internet Protocol (IP) address of a public key server (PKS) of the recipient mobile wallet domain, wherein the IP address is determined from a DNS cache; requesting the public key of the recipient mobile wallet application from the PKS; receiving the public key of the recipient mobile wallet from the PKS, the public key received as part of a digital certificate; authenticating the digital certificate; responsive to successfully authenticating the digital certificate, sending the public key to the MUA, wherein the message is encrypted with the public key of the recipient mobile wallet; wherein the message is one of: a payment, a request for money, a message authorizing a debit, a message authorizing a credit, or a message providing an identification of the user.

Example 8 is a device comprising a processor; a memory communicatively coupled to the processor and including instructions which when performed by a machine, cause the machine to perform operations comprising receiving over a network from a mobile wallet user agent (MUA) of a mobile wallet application executing on a computing device of a user, a message addressed to a recipient mobile wallet application in a recipient mobile wallet domain, the recipient mobile wallet domain a top level domain that is specific to mobile wallet applications; determining an IP address of a MTA of the recipient mobile wallet domain; and sending the message to the MTA of the recipient mobile wallet domain, the MTA of the recipient mobile wallet domain to forward the message to the recipient mobile wallet application.

In Example 9, the subject matter of Example 8 optionally includes wherein the operations further comprise: receiving a request for a public key of a recipient mobile wallet from the MUA; determining an Internet Protocol (IP) address of a public key server (PKS) of the recipient mobile wallet domain; requesting the public key of the recipient mobile wallet application from the PKS; receiving the public key of the recipient mobile wallet from the PKS; and send the public key to the MUA, wherein the message is encrypted with the public key of the recipient mobile wallet.

In Example 10, the subject matter of Example 9 optionally includes wherein the public key is part of a digital certificate provided by a certificate authority.

In Example 11, the subject matter of Example 10 optionally includes wherein the operations further comprise: authenticating the digital certificate prior to sending the public key to the MUA.

In Example 12, the subject matter of any one or more of Examples 8-11 optionally include wherein the operations to determine the IP address of the MTA comprises operations comprising conducting a Domain Name Server (DNS) query with a DNS server.

In Example 13, the subject matter of any one or more of Examples 8-12 optionally include wherein the operations to determine the IP address of the MTA comprises operations comprising determining the IP address from a DNS cache.

In Example 14, the subject matter of any one or more of Examples 8-13 optionally include wherein the operations further comprise: receiving a request for a public key of a recipient mobile wallet from the MUA; determining an Internet Protocol (IP) address of a public key server (PKS) of the recipient mobile wallet domain, wherein the IP address is determined from a DNS cache; requesting the public key of the recipient mobile wallet application from the PKS; receiving the public key of the recipient mobile wallet from the PKS, the public key received as part of a digital certificate; authenticating the digital certificate; responsive to successfully authenticating the digital certificate, sending the public key to the MUA, wherein the message is encrypted with the public key of the recipient mobile wallet; wherein the message is one of: a payment, a request for money, a message authorizing a debit, a message authorizing a credit, or a message providing an identification of the user.

Example 15 is a non-transitory machine readable medium for secure mobile wallet communications, the machine readable medium comprising instructions, which when performed by a machine, cause the machine to perform operations comprising receiving over a network from a mobile wallet user agent (MUA) of a mobile wallet application executing on a computing device of a user, a message addressed to a recipient mobile wallet application in a recipient mobile wallet domain, the recipient mobile wallet domain a top level domain that is specific to mobile wallet applications; determining an IP address of a message transfer agent (MTA) of the recipient mobile wallet domain; and sending the message to the MTA of the recipient mobile wallet domain, the MTA of the recipient mobile wallet domain to forward the message to the recipient mobile wallet application.

In Example 16, the subject matter of Example 15 optionally includes wherein the operations further comprise: receiving a request for a public key of a recipient mobile wallet from the MUA; determining an Internet Protocol (IP) address of a public key server (PKS) of the recipient mobile wallet domain; requesting the public key of the recipient mobile wallet application from the PKS; receiving the public key of the recipient mobile wallet from the PKS; and sending the public key to the MUA, wherein the message is encrypted with the public key of the recipient mobile wallet.

In Example 17, the subject matter of Example 16 optionally includes wherein the public key is part of a digital certificate provided by a certificate authority.

In Example 18, the subject matter of Example 17 optionally includes wherein the operations further comprise: authenticating the digital certificate prior to sending the public key to the MUA.

In Example 19, the subject matter of any one or more of Examples 15-18 optionally include wherein the operations of determining the IP address of the MTA comprises the operations of conducting a Domain Name Server (DNS) query with a DNS server.

In Example 20, the subject matter of any one or more of Examples 15-19 optionally include wherein the operations of determining the IP address of the MTA comprises the operations of determining the IP address from a DNS cache.

In Example 21, the subject matter of any one or more of Examples 15-20 optionally include wherein the operations further comprise: receiving a request for a public key of a recipient mobile wallet from the MUA; determining an Internet Protocol (IP) address of a public key server (PKS) of the recipient mobile wallet domain, wherein the IP address is determined from a DNS cache; requesting the public key of the recipient mobile wallet application from the PKS; receiving the public key of the recipient mobile wallet from the PKS, the public key received as part of a digital certificate; authenticating the digital certificate; responsive to successfully authenticating the digital certificate, sending the public key to the MUA, wherein the message is encrypted with the public key of the recipient mobile wallet; wherein the message is one of: a payment, a request for money, a message authorizing a debit, a message authorizing a credit, or a message providing an identification of the user.

Example 22 is a system for securing transactional message communication, the system comprising at least one processor; and a computer readable medium including instructions that, when executed by the at least one processor, cause the at least one processor to perform operations to: divide a transactional message into a first transaction unit and a second transaction unit; generate a first cryptographic key and a second cryptographic key; encrypt the first transaction unit using the second cryptographic key and the second transaction unit using the first cryptographic key; create a first data packet including the encrypted first transaction unit and the second cryptographic key and a second data packet including the encrypted second transaction unit and the first cryptographic key; and transmit the first data packet over a first transmission path and the second data packet over a second transmission path.

In Example 23, the subject matter of Example 22 optionally includes wherein the first data packet includes a reference to the second data packet and the second data packet includes a reference to the first data packet.

In Example 24, the subject matter of any one or more of Examples 22-23 optionally include wherein the first transmission path uses a first wireless protocol and the second transmission path uses a second wireless protocol.

In Example 25, the subject matter of any one or more of Examples 22-24 optionally include wherein the first transmission path uses a first physical network and the second transmission path uses a second physical network.

In Example 26, the subject matter of any one or more of Examples 22-25 optionally include wherein the first transmission path uses a cellular network and the second communication path uses a Wi-Fi network.

In Example 27, the subject matter of any one or more of Examples 22-26 optionally include wherein the first communication path uses a telephone company network and the second transmission path uses an internet connection.

In Example 28, the subject matter of any one or more of Examples 22-27 optionally include wherein the instructions further cause the at least one processor to perform operations to: receive a request that indicates that one of the first data packet and the second data packet was not received by a recipient; and retransmit, in response to receipt of the request, the first data packet and the second data packet.

In Example 29, the subject matter of Example 28 optionally includes wherein the instructions further cause the at least one processor to perform operations to: generate a third cryptographic key and a fourth cryptographic key; and encrypt the first transaction unit and the second transaction unit before retransmitting the first data packet and the second data packet, wherein the fourth cryptographic key is used to encrypt the first transaction unit and the third cryptographic key is used to encrypt the second transaction unit.

In Example 30, the subject matter of any one or more of Examples 22-29 optionally include wherein the instructions further cause the at least one processor to perform operations to: determine a first half and a second half of the transactional message, wherein the first transaction unit includes the first half and the second transaction unit includes the second half.

In Example 31, the subject matter of any one or more of Examples 22-30 optionally include wherein the instructions further cause the at least one processor to perform operations to: extract odd lines and even lines from the transactional message, wherein the first transaction unit includes the odd lines and the second transaction unit includes the even lines.

Example 32 is at least one computer readable medium including instructions for securing transactional message communication that, when executed by at least one processor, cause the at least one processor to perform operations to: divide a transactional message into a first transaction unit and a second transaction unit; generate a first cryptographic key and a second cryptographic key; encrypt the first transaction unit using the second cryptographic key and the second transaction unit using the first cryptographic key; create a first data packet including the encrypted first transaction unit and the second cryptographic key and a second data packet including the encrypted second transaction unit and the first cryptographic key; and transmit the first data packet over a first transmission path and the second data packet over a second transmission path.

In Example 33, the subject matter of Example 32 optionally includes wherein the first data packet includes a reference to the second data packet and the second data packet includes a reference to the first data packet.

In Example 34, the subject matter of any one or more of Examples 32-33 optionally include wherein the first transmission path uses a first wireless protocol and the second transmission path uses a second wireless protocol.

In Example 35, the subject matter of any one or more of Examples 32-34 optionally include wherein the first transmission path uses a first physical network and the second transmission path uses a second physical network.

In Example 36, the subject matter of any one or more of Examples 32-35 optionally include wherein the first transmission path uses a cellular network and the second communication path uses a Wi-Fi network.

In Example 37, the subject matter of any one or more of Examples 32-36 optionally include wherein the first communication path uses a telephone company network and the second transmission path uses an internet connection.

In Example 38, the subject matter of any one or more of Examples 32-37 optionally include wherein the instructions further cause the at least one processor to perform operations to: receive a request that indicates that one of the first data packet and the second data packet was not received by a recipient; and retransmit, in response to receipt of the request, the first data packet and the second data packet.

In Example 39, the subject matter of Example 38 optionally includes wherein the instructions further cause the at least one processor to perform operations to: generate a third cryptographic key and a fourth cryptographic key; and encrypt the first transaction unit and the second transaction unit before retransmitting the first data packet and the second data packet, wherein the fourth cryptographic key is used to encrypt the first transaction unit and the third cryptographic key is used to encrypt the second transaction unit.

In Example 40, the subject matter of any one or more of Examples 32-39 optionally include wherein the instructions further cause the at least one processor to perform operations to: determine a first half and a second half of the transactional message, wherein the first transaction unit includes the first half and the second transaction unit includes the second half.

In Example 41, the subject matter of any one or more of Examples 32-40 optionally include wherein the instructions further cause the at least one processor to perform operations to: extract odd lines and even lines from the transactional message, wherein the first transaction unit includes the odd lines and the second transaction unit includes the even lines.

Example 42 is a method for securing transactional message communication, the method comprising dividing a transactional message into a first transaction unit and a second transaction unit; generating a first cryptographic key and a second cryptographic key; encrypting the first transaction unit using the second cryptographic key and the second transaction unit using the first cryptographic key; creating a first data packet including the encrypted first transaction unit and the second cryptographic key and a second data packet including the encrypted second transaction unit and the first cryptographic key; and transmitting the first data packet over a first transmission path and the second data packet over a second transmission path.

In Example 43, the subject matter of Example 42 optionally includes wherein the first data packet includes a reference to the second data packet and the second data packet includes a reference to the first data packet.

In Example 44, the subject matter of any one or more of Examples 42-43 optionally include wherein the first transmission path uses a first wireless protocol and the second transmission path uses a second wireless protocol.

In Example 45, the subject matter of any one or more of Examples 42-44 optionally include wherein the first transmission path uses a first physical network and the second transmission path uses a second physical network.

In Example 46, the subject matter of any one or more of Examples 42-45 optionally include wherein the first transmission path uses a cellular network and the second communication path uses a Wi-Fi network.

In Example 47, the subject matter of any one or more of Examples 42-46 optionally include wherein the first communication path uses a telephone company network and the second transmission path uses an internet connection.

In Example 48, the subject matter of any one or more of Examples 42-47 optionally include receiving a request indicating that one of the first data packet and the second data packet was not received by a recipient; and retransmitting in response to receiving the request, the first data packet and the second data packet.

In Example 49, the subject matter of Example 48 optionally includes generating a third cryptographic key and a fourth cryptographic key; and encrypting the first transaction unit using the fourth cryptographic key and the second transaction unit using the third cryptographic key before retransmitting the first data packet and the second data packet.

In Example 50, the subject matter of any one or more of Examples 42-49 optionally include determining a first half and a second half of the transactional message, wherein the first transaction unit includes the first half and the second transaction unit includes the second half.

In Example 51, the subject matter of any one or more of Examples 42-50 optionally include extracting odd lines and even lines from the transactional message, wherein the first transaction unit includes the odd lines and the second transaction unit includes the even lines.

Example 52 is a method for securing transactional message communication, the method comprising receiving a first data packet over a first transmission path and a second data packet over a second transmission path, the first data packet including a first encrypted transaction unit and a second cryptographic key and the second data packet including a second encrypted transaction unit and a first cryptographic key; decrypting the first encrypted transaction unit using the second cryptographic key and the second encrypted transaction unit using the first cryptographic key; combining the first decrypted transaction unit and the second decrypted transaction unit into a transactional message; and forwarding the transactional message to a mobile wallet for further processing.

In Example 53, the subject matter of Example 52 optionally includes wherein the first data packet includes a reference to the second data packet and the second data packet includes a reference to the first data packet.

In Example 54, the subject matter of any one or more of Examples 52-53 optionally include wherein the first transmission path uses a first wireless protocol and the second transmission path uses a second wireless protocol.

In Example 55, the subject matter of any one or more of Examples 52-54 optionally include wherein the first transmission path uses a first physical network and the second transmission path uses a second physical network.

In Example 56, the subject matter of any one or more of Examples 52-55 optionally include wherein the first transmission path uses a cellular network and the second communication path uses a Wi-Fi network.

In Example 57, the subject matter of any one or more of Examples 52-56 optionally include wherein the first communication path uses a telephone company network and the second transmission path uses an internet connection.

In Example 58, the subject matter of any one or more of Examples 52-57 optionally include determining that only one data packet of the first data packet and the second data packet have been received; transmitting a request to resend the first data packet and the second data packet to a sender of the only data packet; and receiving in response to the request, the first data packet and the second data packet.

Example 59 is a method for secure mobile wallet communications, the method comprising receiving a message from a second mobile wallet addressed to a first mobile wallet, the message including a portion encrypted with a private key of the second mobile wallet; retrieving a public key of the second mobile wallet; decrypting the portion with the public key to create a decrypted portion; determining that a hash of the message matches a data field in the decrypted portion; responsive to determining that the hash of the message matches the hash in the decrypted portion, marking the message as having come from the second mobile wallet; and presenting that the message came from the second mobile wallet to a user.

In Example 60, the subject matter of Example 59 optionally includes wherein retrieving the public key of the second mobile wallet comprises: contacting a public key server of a domain of the second mobile wallet.

In Example 61, the subject matter of any one or more of Examples 59-60 optionally include sending a challenge message to the second mobile wallet, the challenge message requesting details about at least one of: account details of a user of the first mobile wallet known to the second mobile wallet, transaction details of a user of the first mobile wallet known to the second mobile wallet, a predetermined data field know to both the first and second mobile wallets, and driver's license information of the user of the first mobile wallet; receiving a challenge-response; determining whether the challenge-response includes a correct answer to the challenge message; responsive to determining that the challenge-response includes the correct answer, marking the message as authenticated; and causing a display indicating that the message is authenticated.

In Example 62, the subject matter of any one or more of Examples 59-61 optionally include wherein retrieving the public key, decrypting the portion with the public key, determining that the hash matches the hash in the decrypted portion, marking the message, and presenting the message is done automatically in response to receiving the message.

In Example 63, the subject matter of any one or more of Examples 59-62 optionally include wherein retrieving the public key, decrypting the portion with the public key, determining that the hash matches the hash in the decrypted portion, marking the message, and presenting the message is done upon a user request in response to receiving the message.

In Example 64, the subject matter of any one or more of Examples 59-63 optionally include wherein retrieving the public key, decrypting the portion with the public key, determining that the hash matches the hash in the decrypted portion, marking the message, and presenting the message is done automatically based upon determining that a type of the message is a predetermined type of message.

In Example 65, the subject matter of any one or more of Examples 59-64 optionally include determining that the hash of the message does not match the hash in the decrypted portion; responsive to determining that the hash of the message does not match the hash in the decrypted portion, marking the message as suspicious; and presenting that the message is unverified to a user.

Example 66 is a device for facilitating secure mobile wallet communications, the device comprising a processor; a memory communicatively coupled to the processor, the memory comprising instructions that when performed by the processor, causes the processor to perform operations to at least: receive a message from a second mobile wallet addressed to a first mobile wallet, the message including a portion encrypted with a private key of the second mobile wallet; retrieve a public key of the second mobile wallet; decrypt the portion with the public key to create a decrypted portion; determine that a hash of the message matches a data field in the decrypted portion; responsive to a determination that the hash of the message matches the hash in the decrypted portion, mark the message as having come from the second mobile wallet; and present that the message came from the second mobile wallet to a user.

In Example 67, the subject matter of Example 66 optionally includes wherein the operations to retrieve the public key of the second mobile wallet comprises operations to at least: contact a public key server of a domain of the second mobile wallet.

In Example 68, the subject matter of any one or more of Examples 66-67 optionally include wherein the operations further comprise operations to: send a challenge message to the second mobile wallet, the challenge message requesting details about at least one of: account details of a user of the first mobile wallet known to the second mobile wallet, transaction details of a user of the first mobile wallet known to the second mobile wallet, a predetermined data field know to both the first and second mobile wallets, and driver's license information of the user of the first mobile wallet; receive a challenge-response; determine whether the challenge-response includes a correct answer to the challenge message; responsive to a determination that the challenge-response includes the correct answer, mark the message as authenticated; and cause a display indicating that the message is authenticated.

In Example 69, the subject matter of any one or more of Examples 66-68 optionally include wherein the operations to retrieve the public key, decrypt the portion with the public key, determine that the hash matches the hash in the decrypted portion, mark the message, and present the message is done automatically in response to receipt of the message.

In Example 70, the subject matter of any one or more of Examples 66-69 optionally include wherein the operations to retrieve the public key, decrypt the portion with the public key, determine that the hash matches the hash in the decrypted portion, mark the message, and present the message is done upon receipt of a user request in response to a receipt of the message.

In Example 71, the subject matter of any one or more of Examples 66-70 optionally include wherein the operations to retrieve the public key, decrypt the portion with the public key, determine that the hash matches the hash in the decrypted portion, mark the message, and present the message is done automatically based upon a determination that a type of the message is a predetermined type of message.

In Example 72, the subject matter of any one or more of Examples 66-71 optionally include wherein the operations further comprise operations to: determine that the hash of the message does not match the hash in the decrypted portion; responsive to the determination that the hash of the message does not match the hash in the decrypted portion, mark the message as suspicious; and present that the message is unverified to a user.

Example 73 is a non-transitory machine readable medium for secure mobile wallet communications, the machine readable medium comprising instructions, which when performed by the machine, causes the machine to perform operations comprising receiving a message from a second mobile wallet addressed to a first mobile wallet, the message including a portion encrypted with a private key of the second mobile wallet; retrieving a public key of the second mobile wallet; decrypting the portion with the public key to create a decrypted portion; determining that a hash of the message matches a data field in the decrypted portion; responsive to determining that the hash of the message matches the hash in the decrypted portion, marking the message as having come from the second mobile wallet; and presenting that the message came from the second mobile wallet to a user.

In Example 74, the subject matter of Example 73 optionally includes wherein the operations of retrieving the public key of the second mobile wallet comprises the operations of: contacting a public key server of a domain of the second mobile wallet.

In Example 75, the subject matter of any one or more of Examples 73-74 optionally include wherein the operations further comprise: sending a challenge message to the second mobile wallet, the challenge message requesting details about at least one of: account details of a user of the first mobile wallet known to the second mobile wallet, transaction details of a user of the first mobile wallet known to the second mobile wallet, a predetermined data field know to both the first and second mobile wallets, and driver's license information of the user of the first mobile wallet; receiving a challenge-response; determining whether the challenge-response includes a correct answer to the challenge message; responsive to determining that the challenge-response includes the correct answer, marking the message as authenticated; and causing a display indicating that the message is authenticated.

In Example 76, the subject matter of any one or more of Examples 73-75 optionally include wherein the operations of retrieving the public key, decrypting the portion with the public key, determining that the hash matches the hash in the decrypted portion, marking the message, and presenting the message is done automatically in response to receiving the message.

In Example 77, the subject matter of any one or more of Examples 73-76 optionally include wherein the operations of retrieving the public key, decrypting the portion with the public key, determining that the hash matches the hash in the decrypted portion, marking the message, and presenting the message is done upon a user request in response to receiving the message.

In Example 78, the subject matter of any one or more of Examples 73-77 optionally include wherein the operations of retrieving the public key, decrypting the portion with the public key, determining that the hash matches the hash in the decrypted portion, marking the message, and presenting the message is done automatically based upon determining that a type of the message is a predetermined type of message.

In Example 79, the subject matter of any one or more of Examples 73-78 optionally include wherein the operations further comprise: determining that the hash of the message does not match the hash in the decrypted portion; responsive to determining that the hash of the message does not match the hash in the decrypted portion, marking the message as suspicious; and presenting that the message is unverified to a user.

What is claimed is:

1. A method for secure mobile wallet communications, the method comprising:
   using one or more processors:
   executing a first mobile wallet application;
   authenticating a message received from a second mobile wallet application by:
     comparing a calculated hash of the message to a hash value contained in the message, the hash value contained in the message being in an encrypted form;
     responsive to determining that the calculated hash of the message matches the hash value contained in the message:
       sending a challenge to the second mobile wallet application, the challenge requesting financial account information from the second mobile wallet application about a user of the first mobile wallet application;
       receiving a challenge-response;
       determining whether the challenge-response includes a correct answer to the challenge;
       responsive to determining that the challenge-response includes the correct answer, marking the message from the second mobile wallet application as authenticated; and
     responsive to authenticating the message, engaging in a financial transaction with the second mobile wallet application.

2. The method of claim 1, further comprising:
   contacting a public key server of a domain of the second mobile wallet application;
   obtaining a public key of the second mobile wallet application from the public key server; and
   wherein comparing the calculated hash of the message to the hash value contained in the message comprises decrypting the hash value contained in the message using the public key of the second mobile wallet application.

3. The method of claim 1, comprising:
   receiving a second message from a third mobile wallet application;

determining that a hash of the second message does not match a hash in a decrypted portion of the second message; and responsive to determining that the hash of the second message does not match the hash in the decrypted portion of the second message, marking the second message as unverified.

4. The method of claim 1, comprising:
receiving a second message from a third mobile wallet application;
sending a second challenge to the third mobile wallet application;
receiving a second challenge response from the third mobile wallet application;
determining whether the second challenge response includes a second correct answer to the challenge; and
responsive to determining that the second challenge-response does not include the second correct answer, marking the message from the second mobile wallet application as unverified.

5. The method of claim 1, wherein the authentication is automatically done in response to receiving the message from the second mobile wallet application.

6. The method of claim 1, wherein the authentication is done responsive to a request from a user of the first mobile wallet application.

7. A device for secure mobile wallet communications, the device comprising:
one or more processors executing a first mobile wallet application, the first mobile wallet application configured to perform operations comprising:
authenticating a message received from a second mobile wallet application by:
comparing a calculated hash of the message to a hash value contained in the message, the hash value contained in the message being in an encrypted form;
responsive to determining that the calculated hash of the message matches the hash value contained in the message:
sending a challenge to the second mobile wallet application, the challenge requesting financial account information from the second mobile wallet application about a user of the first mobile wallet application;
receiving a challenge-response;
determining whether the challenge-response includes a correct answer to the challenge;
responsive to determining that the challenge-response includes the correct answer, marking the message from the second mobile wallet application as authenticated; and
responsive to authenticating the message, engaging in a financial transaction with the second mobile wallet application.

8. The device of claim 7, further comprising:
contacting a public key server of a domain of the second mobile wallet application;
obtaining a public key of the second mobile wallet application from the public key server; and
wherein comparing the calculated hash of the message to the hash value contained in the message comprises decrypting the hash value contained in the message using the public key of the second mobile wallet application.

9. The device of claim 7, comprising:
receiving a second message from a third mobile wallet application;

determining that a hash of the second message does not match a hash in a decrypted portion of the second message; and responsive to determining that the hash of the second message does not match the hash in the decrypted portion of the second message, marking the second message as unverified.

10. The device of claim 7, comprising:
receiving a second message from a third mobile wallet application;
sending a second challenge to the third mobile wallet application;
receiving a second challenge response from the third mobile wallet application;
determining whether the second challenge response includes a second correct answer to the challenge; and
responsive to determining that the second challenge-response does not include the second correct answer, marking the message from the second mobile wallet application as unverified.

11. The device of claim 7, wherein the authentication is automatically done in response to receiving the message from the second mobile wallet application.

12. The device of claim 7, wherein the authentication is done responsive to a request from a user of the first mobile wallet application.

13. A non-transitory machine-readable medium storing instructions of a first mobile wallet application, the instructions when executed by a machine, causes the machine to perform operations comprising:
authenticating a message received from a second mobile wallet application by:
comparing a calculated hash of the message to a hash value contained in the message, the hash value contained in the message being in an encrypted form;
responsive to determining that the calculated hash of the message matches the hash value contained in the message:
sending a challenge to the second mobile wallet application, the challenge requesting financial account information from the second mobile wallet application about a user of the first mobile wallet application;
receiving a challenge-response;
determining whether the challenge-response includes a correct answer to the challenge;
responsive to determining that the challenge-response includes the correct answer, marking the message from the second mobile wallet application as authenticated; and
responsive to authenticating the message, engaging in a financial transaction with the second mobile wallet application.

14. The machine-readable medium of claim 13, wherein the operations further comprise:
contacting a public key server of a domain of the second mobile wallet application;
obtaining a public key of the second mobile wallet application from the public key server; and
wherein comparing the calculated hash of the message to the hash value contained in the message comprises decrypting the hash value contained in the message using the public key of the second mobile wallet application.

15. The machine-readable medium of claim 13, wherein the operations further comprise:

receiving a second message from a third mobile wallet application;
determining that a hash of the second message does not match a hash in a decrypted portion of the second message; and
responsive to determining that the hash of the second message does not match the hash in the decrypted portion of the second message, marking the second message as unverified.

16. The machine-readable medium of claim 13, wherein the operations further comprise:
receiving a second message from a third mobile wallet application;
sending a second challenge to the third mobile wallet application;
receiving a second challenge response from the third mobile wallet application;
determining whether the second challenge response includes a second correct answer to the challenge; and
responsive determining that the second challenge-response does not include the second correct answer, marking the message from the second mobile wallet application as unverified.

17. The machine-readable medium of claim 13, wherein the authentication is automatically done in response to receiving the message from the second mobile wallet application.

* * * * *

UNITED STATES PATENT AND TRADEMARK OFFICE
CERTIFICATE OF CORRECTION

| | | |
|---|---|---|
| PATENT NO. | : 10,505,743 B1 | Page 1 of 1 |
| APPLICATION NO. | : 16/057067 | |
| DATED | : December 10, 2019 | |
| INVENTOR(S) | : Maeng et al. | |

It is certified that error appears in the above-identified patent and that said Letters Patent is hereby corrected as shown below:

In the Claims

In Column 33, Line 20, in Claim 16, after "responsive", insert --to--

Signed and Sealed this
Twenty-first Day of July, 2020

Andrei Iancu
*Director of the United States Patent and Trademark Office*